(12) United States Patent
Kosonen et al.

(10) Patent No.: US 9,928,821 B2
(45) Date of Patent: Mar. 27, 2018

(54) COMPOSITE HAVING ACOUSTIC PROPERTIES, MANUFACTURING THE COMPOSITE, A COMPONENT COMPRISING A COMPOSITE, MANUFACTURING THE COMPONENT AND USES THEREOF

(71) Applicant: UPM-Kymmene Corporation, Helsinki (FI)

(72) Inventors: Harri Kosonen, Lappeenranta (FI); Sami Turunen, Lappeenranta (FI); Jere Salminen, Lappeenranta (FI); Petri Myllytie, Porsgrunn (NO); Kari Luukko, Espoo (FI); Stefan Fors, Kausala (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 182 days.

(21) Appl. No.: 14/783,570

(22) PCT Filed: Apr. 9, 2013

(86) PCT No.: PCT/FI2013/050388
§ 371 (c)(1),
(2) Date: Oct. 9, 2015

(87) PCT Pub. No.: WO2014/167167
PCT Pub. Date: Oct. 16, 2014

(65) Prior Publication Data
US 2016/0063984 A1 Mar. 3, 2016

(51) Int. Cl.
*C08K 7/02* (2006.01)
*G10K 11/162* (2006.01)
(Continued)

(52) U.S. Cl.
CPC .............. *G10K 11/162* (2013.01); *C08K 7/02* (2013.01); *G10D 17/00* (2013.01); *G10K 11/002* (2013.01)

(58) Field of Classification Search
CPC .... G10K 11/162; G10K 11/002; G10D 17/00; C09K 7/02
See application file for complete search history.

(56) References Cited

U.S. PATENT DOCUMENTS 6,743,507 B2 * 6/2004 Barlow .................... B29B 7/48
428/292.1

FOREIGN PATENT DOCUMENTS

EP 2223785 A2 9/2010
JP 03028260 6/1991
(Continued)

OTHER PUBLICATIONS

International Search Report dated Feb. 14, 2014; International Application No. PCT/FI2013/050388; International Filing Date Apr. 9, 2013 (6 pages).
Written Opinion dated Feb. 14, 2014; International Application No. PCT/FI2013/050388; International Filing Date Apr. 9, 2013 (7 pages).

*Primary Examiner* — C Melissa Koslow
(74) *Attorney, Agent, or Firm* — Cantor Colburn LLP

(57) ABSTRACT

The invention relates to a composite comprising matrix material and organic natural fiber material. The composite may be a compound, a granulate, or at least a part of a sound reproduction device. The composite may be made by injection molding. According to an embodiment a composite comprises matrix material and organic natural fiber based material, wherein the matrix material comprises a thermoplastic polymer matrix. The composite may comprise a relative sound wave resistance of 1500-5000. The composite may comprise a relative damping of sound radiation of 1.5-5.0. The composite may comprise a dynamic modulus of (Continued)

2000-11000 measured according to ISO 6721-3. The composite may comprise a relative acoustic quality factor of 5-200. The composite may comprise a relative factor of viscous damping of 0.500-0.005.

20 Claims, 4 Drawing Sheets

(51) Int. Cl.
*G10D 17/00* (2006.01)
*G10K 11/00* (2006.01)

(56) References Cited

FOREIGN PATENT DOCUMENTS

| | | |
|---|---|---|
| JP | 08016156 | 1/1996 |
| JP | 2002305783 | 10/2002 |
| JP | 2004320670 | 11/2004 |
| JP | 2006116807 | 5/2006 |
| JP | 2011246502 | 12/2011 |
| WO | 2004009943 A1 | 1/2004 |
| WO | 2007056839 A1 | 5/2007 |
| WO | WO 2007/056839 * | 5/2007 |
| WO | WO 2010/122224 * | 10/2010 |
| WO | 2012002253 | 1/2012 |
| WO | 2014068166 A1 | 5/2014 |

* cited by examiner

1002

COMPOSITE HAVING ACOUSTIC PROPERTIES, MANUFACTURING THE COMPOSITE, A COMPONENT COMPRISING A COMPOSITE, MANUFACTURING THE COMPONENT AND USES THEREOF

FIELD OF THE APPLICATION

The application relates to a composite comprising matrix material and organic natural fiber based material, wherein the composite comprises acoustic properties. The application relates to manufacturing the composite. The application further relates to a component comprising the composite, manufacturing the composite, a loudspeaker comprising the composite and uses of the composite and the component.

BACKGROUND

Humans are perceptive to various types of mechanical vibrations. When the mechanical vibration falls into a specific frequency range, it may be heard as an audible sound. In a variety of applications the acoustical properties of a product may play an important role. A product may be designed to strengthen or attenuate sounds. Examples of such products are insulating or isolating panels, audio systems, loudspeakers or earphones. Acoustical properties of a product may depend at least to some extent of material(s) used in the product.

SUMMARY

An object of the application is to provide a composite material for acoustic applications. Another object of the application is to provide a component comprising the composite, or a component made of the composite.

According to an embodiment a composite comprises matrix material and organic natural fiber based material, wherein the matrix material comprises a thermoplastic polymer matrix, and the composite comprises a relative sound wave resistance of 1500-5000.

According to an embodiment a composite comprises matrix material and organic natural fiber based material, wherein the matrix material comprises a thermoplastic polymer matrix, and the composite comprises a relative damping of sound radiation of 1.5-5.0.

According to an embodiment a composite comprises matrix material and organic natural fiber based material, wherein the matrix material comprises a thermoplastic polymer matrix, and the composite comprises a dynamic modulus of 2000-11000 measured according to ISO 6721-3.

According to an embodiment a composite comprises matrix material and organic natural fiber based material, wherein the matrix material comprises a thermoplastic polymer matrix, and the composite comprises a relative acoustic quality factor of 5-200, wherein the relative acoustic quality factor is dependent on a relative sound wave resistance, a relative damping of sound radiation and a relative factor of viscous damping.

According to an embodiment composite comprises matrix material and organic natural fiber based material, wherein the matrix material comprises a thermoplastic polymer matrix, and the composite comprises a relative factor of viscous damping of 0.500-0.005.

According to an example a component comprises a composite according to embodiments. In an example a loudspeaker comprises a composite according to embodiments.

In another example a musical instrument comprises a composite according to embodiments.

According to an example an acoustic material for attenuating sound comprises a composite according to embodiments. In an example an acoustic material for strengthening sound comprises a composite according to embodiments.

According to an embodiment a layer structure comprises at least two layers, wherein at least one of the at least two layers comprises a composite comprising matrix material and organic natural fiber based material.

A method for manufacturing a composite according embodiments, the method comprising heating the matrix material comprising a thermoplastic polymer matrix to a melt form, mixing the organic natural fiber material with the melt matrix material, shaping the mixture with a mold or a die, and solidifying the shaped mixture to form the composite.

According to an embodiment a loudspeaker casing comprises a composite of two surfaces, wherein the composite comprises matrix material and organic natural fiber based material, and the loudspeaker casing comprises sound direction parts integral with and formed simultaneously with the composite, wherein the sound direction parts are situated on an internal surface of the loudspeaker casing.

Use of a loudspeaker comprising a composite according to embodiments, wherein the use may occur outdoors or at a space of a certain volume.

DESCRIPTION OF THE DRAWINGS

The appended drawings illustrate some embodiments of the invention. The drawings are not in scale.

DETAILED DESCRIPTION OF EMBODIMENTS

Figure 1:
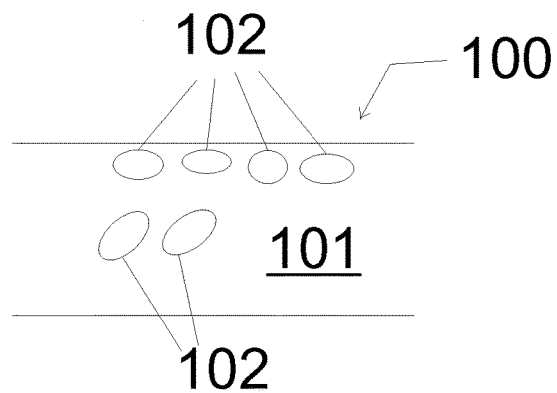
FIG. 1 illustrates a composite according to an embodiment of the invention.

In the following some illustrative embodiments and examples of the invention are described in more detail with the accompanying figures. The embodiments are presented as illustrative examples, and are not to be construed limiting. The following items are illustrated in the figures:

100 a composite or composite material
101 matrix material
102 organic natural fiber based material
1002 organic natural fiber component
401 heating 402 mixing
403 shaping
404 solidifying
501 surface zone
502 center zone
601 layer
602 layer
701 sound direction part The percentage amounts in this application are weight percentages (wt-%), unless otherwise defined. Exception to this are percentages (%) relating to change or comparison between quantities.

A Composite

FIG. 1 illustrates a composite 100 according to an embodiment of the invention. A composite 100 comprises matrix material 101 and organic natural fiber based material 102. The composite 100 comprises two or more material components combined together. At least in some/all embodiments the constituents of the component retain their identity. In addition to matrix material 101 and organic natural fiber based material 102 other additives may be blended to the composite. The matrix material 101 and organic natural fiber based material 102 may not dissolve or otherwise merge completely with each other in a composite. The properties of the composite 100 may differ from the properties of its components acting alone.

Matrix Material

A composite according to embodiments comprises matrix material, to which organic natural fiber based material is compounded. The matrix material 101 may comprise any suitable polymer or polymer composition. The polymer matrix 101 may comprise polymer, such as a thermoplastic polymer. Thermoplastic polymer is long chain polymer that may comprise amorphous or semi-crystalline structure. According to an embodiment the matrix material contains at least 50 wt-% (weight percent), at least 60 wt-%, more preferably at least 70 wt-%, or at least 80 wt-%, and most preferably at least 90 wt-% or at least 95 wt-% of thermoplastic polymer. The thermoplastic polymer comprises for example polyolefin, polyethylene, polypropylene, polystyrene, polyamide, polyester, polyether, polylactides, polyhydroxyalkanoates, polycaprolactone, polyglycolide, polybutylene, poly(adipate-co-terephthalate), polybutylenesuccinate, aliphatic polyesters, aromatic polyesters, poly(acrylic nitrile butadiene styrene) copolymer (ABS), polycarbonate, biopolymer, e.g. polylactide, biodegradable polymer, bio-based polymer, thermoplastic elastomer, polysaccharides, polyimide, polyvinyl chloride, their derivatives, and/or any combinations thereof. In an embodiment the amount of the thermoplastic material in the matrix material is at least 80 wt-%, more preferably at least 90 wt-%, and most preferably at least 95 wt-%. The matrix material may comprise 40-98 wt-%, or preferably 60-95 wt-% thermoplastic polymer or polymer composition. In an embodiment the amount of the thermoplastic material in the composite comprising matrix material and organic natural fiber based material is 5-90 wt-%, more preferably 10-75 wt-%, more preferably 20-65 wt-%, or most preferably 40-60 wt-%.

A suitable thermoplastic polymer retains sufficient thermoplastic properties to allow melt blending with organic natural fiber based material. The thermoplastic polymer may have effect of enabling providing shaped articles and/or components from the composite. Thermoplastic polymer may be manufactured and/or shaped by injection molding, for example. Thermoplastic polymer may have effect of enabling providing integral shapes, which extend over a corner and/or which extend to a second surface, which may not be parallel with a first surface of an integral thermoplastic component.

Advantageously, the matrix material comprises at least one of crystalline polymer, non-crystalline polymer, crystalline oligomer, non-crystalline oligomer, semi-crystalline polymer and semi-crystalline oligomer or a combination thereof. The matrix materials comprise glass transition temperatures. Semi-crystalline polymers comprise in addition melt temperatures. Semi-crystalline polymers may comprise both crystalline and amorphous portions. Corresponding stiff and soft portions may have effect on acoustic properties of a composite. According to an embodiment a crystalline matrix material may have effect of providing higher stiffness and smaller (relative) factor of viscous damping compared to an amorphous matrix material. Semi-crystalline matrix material may have effect of combining desired stiffness and damping of sound waves. Polyolefin, for example a polypropylene, is an example of a semi-crystalline matrix material. Degree of crystallinity for an amorphous matrix is approaching zero. For a semi-crystalline polymers degree of crystallinity may be 10-80 wt-%, or preferably 20-70 wt-%, or more preferably 40-60 wt-%. Polyolefin may comprise degree of crystallinity of 40-60 wt-%. Polypropylene may comprise degree of crystallinity of 40-60 wt %. Material comprising small molecules may achieve higher degree of crystallinity compared to materials comprising bigger molecules. Methods for evaluating the degree of crystallinity comprise density measurement, differential scanning calorimetry (DSC), X-ray diffraction (XRD), infrared spectroscopy and nuclear magnetic resonance (NMR). The measured value is dependent on the method used. Distribution of crystalline and amorphous regions may be visualized with microscopic techniques, like polarized light microscopy and transmission electron microscopy.

The polymer matrix 101 of a composite 100 may comprise a polyolefin. The polymer matrix may comprise, for example, a homopolymer, a copolymer or a modified polymer of unsaturated aliphatic hydrocarbons. Polymers, which may be used in polymer composites comprising organic natural fiber based material may comprise, for example, polyethylene, polypropylene, polystyrene, polyamides, polyesters, and combinations thereof. The preferred polyolefins may comprise $C_2$-$C_4$ polyolefins, such as polyethylene and polypropylene.

The polymer matrix 101 may comprise recycled polymer. Alternatively, the polymer matrix may comprise virgin polymer. In addition, the polymer matrix may comprise both recycled polymer and virgin polymer. A virgin polymer may be added to the polymer matrix. The amount of added polymer, such as polypropylene, may depend on the other raw materials used. For example, if recycled polymer material is used, the amount of added virgin polymer may depend on the amount of the different raw materials coming along the recycled material. The recycled raw material may comprise paper or plastic polymer or both paper and plastic polymer. The polymer matrix may comprise at least 50 wt-%, or preferably 70 wt-%, or more preferably 95 wt-% of virgin polymer. In an example the polymer matrix comprises 100 wt-% of virgin polymer. The virgin polymer may have effect of providing better stiffness properties compared to recycled polymer.

Biodegradable polymer may comprise polyhydroxyalkanoates; cellulose acetate; cellulose derivatives, like cellulose acetate butyrate or cellulose butyrate; polylactides; starches and starch blends; polycaprolactone; polybutylene succinate; polyesterurethane; polylactic acid (PLA), like poly-L-lactide, poly-D-lactide, poly-DL-lactide; polysaccharides and polysaccharide esters or ethers, polyester; polyester co-polymer; polyesteramide or any combination or derivatives thereof.

Density of a polymer matrix material in a solid form may be approximately 1 g/m³, for example 0.8-1.7 g/m³. For example, low density polyethylene (LDPE) comprises density of 0.840-0.926 g/cm³; medium density polyethylene (MDPE) comprises density of 0.926-0.941 g/cm³, high density polyethylene (HDPE) comprises density of 0.941-0.990 g/cm³, polypropylene (PP) comprises density of 0.85-0.95 g/cm³, polystyrene (PS) comprises density of 1.00-1.150 g/cm³, polylactic acid (PLA) comprises density of 1.18-1.50 g/cm³.

Matrix material according to embodiments may be formed into a new shape several times when it is heated. The matrix material keeps its new shape after cooling and then it flows very slowly, or it does not flow at all. The matrix material has at least one repeat unit. Number average molecular weight of the matrix material may be 18-1000 g/mol, or 100-500 g/mol, or 500-1000 g/mol, or 1000-10 000 g/mol, or 10 000-100 000 g/mol, or over 100 000 g/mol.

Organic Natural Fiber Material

An organic natural fiber based material comprises organic natural fiber material and regenerated organic natural fiber material. In at least some/all embodiments organic natural fiber material refers to particles, such as fibers or fiber-like particles, that contain cellulose. The organic natural fiber material may comprise mechanically treated and/or chemically treated fibers and/or fiber-like particles. The treated particles used may comprise at least 30 wt-% or at least 40 wt-%, more preferably at least 50 wt-% or at least 60 wt-%, and most preferably at least 80 wt-% or at least 90 wt-% of mechanically treated organic natural fiber material.

Mechanically treated may refer to organic natural fiber material, which is isolated from any organic natural raw material comprising cellulose by a mechanical pulping process. The mechanical pulping process could be preceded by a chemical pretreatment, producing chemimechanical pulp. The mechanically treated organic natural fiber material may be, for example, ground, refined and/or powdered from the source used. In other words, a mechanical force has been used to treat source of the organic natural fiber material. The mechanically treated organic natural fiber material may comprise, among other things, wood flour, saw dust, chip material, and/or mechanical pulp such as thermo mechanical pulp (TMP), groundwood pulp (GW), stone groundwood pulp (SGW), pressure groundwood pulp (PGW), refiner mechanical pulp (RMP), and/or chemithermomechanical pulp (CTMP). The mechanically treated organic natural fiber material preferably comprises or consist of wood-based material, such as wood-based fibers, but they may also comprise or consist of non-wood material. The mechanically treated organic natural fiber material may comprise recycled and/or virgin material, such as fibers or fiber-like particles. For example, at least 30 wt-% or at least 40 wt-%, more preferably at least 60 wt-%, and most preferably at least 80 wt-%, or most preferably at least 90 wt-% of the organic natural fiber material used may be virgin. In an example, 100 wt-% of the organic natural fiber material comprises virgin. For example, mechanically treated organic natural fiber may comprise the saw dust or at least other mechanically treated wood or plant particles as main organic natural fiber material. Mechanically treated organic natural fiber material typically comprises lignin. In mechanically treated organic natural fiber material, such as cellulose based fibers, lignin is present in various amounts, but typically in higher amounts than in chemically treated organic natural fiber material. Lignin is a highly polymeric material, able to crosslink and may act as a water repellent in a cellulose based fiber plastic composite. For example in wood cells the presence of lignin limits the penetration of water into the wood cells, which makes the structure very compact. Organic natural fiber material comprising lignin, however, is prone to decompose more easily at relatively low extrusion or injection molding temperatures, like 100-150° C., than fiber material free of lignin.

The chemically treated organic natural fiber material preferably comprises chemical wood based pulp. The chemical pulp may be, for example, from kraft process or sulfite process, but also other chemical processes may be used, such as a soda pulping process. Preferably, the chemical pulp is from the kraft process. The chemically treated organic natural fiber material preferably comprises or consists of wood based cellulose, but it may also be non-wood material. The chemically treated organic natural fiber material may comprise recycled and/or virgin fibers and/or fiber-like particles. Advantageously, at least 30 wt-% or at least 40 wt-%, more preferably at least 50 wt-% or at least 60 wt-%, and most preferably at least 80 wt-% or at least 90 wt-% of the organic natural fiber material is chemically treated. According to an example 100 wt-% of the organic natural fiber material is chemically treated. Advantageously, at least 30 wt-% or at least 40 wt-%, more preferably at least 50 wt-% or at least 60 wt-%, and most preferably at least 80 wt-% or at least 90 wt-%, or at least 95 wt-% of the chemically treated organic natural fiber material originates from a kraft process. Advantageously, the pulp production method for organic natural fiber material comprising cellulose is based on sulfate cooking, also called as kraft cooking or pulping. Advantageously, lignin content of the chemically treated pulp is 0.01-15.00 wt-%, preferably 0.01-10.00 wt-% or 0.01-5.00 wt-%, more preferably 0.01-3.00 wt-%, 0.01-2.00 wt-% or 0.01-1.00 wt-% and most preferably 0.01-0.50 wt-%. Preferably, the alfa cellulose content of the chemically treated pulp is above 50 wt-%, preferably above 60 wt-%, more preferably above 70 wt-% and most preferably above 72 wt-% or above 75 wt-%. Advantageously, the alfa cellulose content of the chemically treated pulp is below 99 wt-%, preferable below 90 wt-%, more preferably below 85 wt-% and most preferably below 80 wt-%.

The wood material can be softwood trees, such as spruce, pine, fir, larch, douglas-fir or hemlock, or hardwood trees, such as birch, aspen, poplar, alder, eucalyptus, or acacia, or a mixture of softwoods and hardwoods. In an advantageous example, at least 30 wt-% or at least 40 wt-%, more preferably at least 50 wt-% or at least 60 wt-%, and most preferably at least 80 wt-% or at least 90 wt-% of organic natural fiber material of a composite is wood based material. In an example 100 wt-% of organic natural fiber material of a composite is wood based material.

Non-wood material can be agricultural residues, grasses or other plant substances such as straw, coconut, leaves, bark, seeds, hulls, flowers, vegetables or fruits from cotton, corn, wheat, oat, rye, barley, rice, flax, hemp, manila hemp, sisal hemp, jute, ramie, kenaf, bagasse, bamboo, or reed. The organic natural fiber material may be, at least partly, in the form of paper sheet or web, board sheet or web or pulp sheet or web, or compacted fiber matrix or pieces of compacted fibers and their combinations.

A regenerated organic natural fiber material is comprised in the organic natural fiber based material according to the embodiments of the invention. A regenerated organic fiber material may be used to produce materials for manufacturing of polymer composites. A regenerated organic natural fiber material preferably comprises dissolving pulp. Viscose, which can be manufactured from dissolving pulp, is an example of a regenerated organic natural fiber material. Fibers made of cellulose carbamate or fibers regenerated at least partly of organic natural fiber material from the carbamate and containing silicon dioxide in their structure may be used in similar applications as viscose. These regenerated fibers may further be modified, for example by chemical treatment. The regenerated organic natural fiber based material may refer to man-made fibers.

The amount of the organic natural fiber material is calculated as the total amount of the untreated and/or in the above-mentioned way mechanically treated, and/or in the above-mentioned way chemically treated organic natural fiber material in a system or a product. The amount of the organic natural fiber based material is calculated as the total amount of the untreated and/or in the above-mentioned way mechanically treated, and/or in the above-mentioned way chemically treated, and/or in the above mentioned way regenerated organic natural fiber material in a system or a product.

The organic natural fiber material may comprise recycled material, for example raw material pulp of recycle streams of wood materials. The recycled material may comprise recycled paper material. The organic natural material may be, at least partly, in the form of large fiber or fiber bundles, paper chaff, pulp chaff, crushed pulp material, derivatives thereof and their combinations.

Organic natural fiber material 102 may comprise wood-based cellulose pulp fibers. In at least some/all embodiments organic natural fiber material refers to particles, such as fibers or fiber-like particles, that contain cellulose. The organic natural fiber material may originate from any plant material that contains cellulose. At least one of, or both, wood material and non-wood material may be comprised in the organic natural fiber material.

The organic natural fiber material 102 may be, at least mostly, in the form of fibers, such as floccules, single fibers, or parts of single fibers, or the organic natural fiber material may be in the form of fiber-like particles, such as saw dust or grinded material, where the material does not have exactly spherical form. At least in some embodiments the longest dimension of the particle is less than 5 times longer than the smallest dimension. Preferably the organic natural fiber material is, at least partly, in the form of fibers. Preferably at least 40 wt-% or at least 50 wt-%, more preferably at least 60 wt-% or at least 70 wt-% and most preferably at least 80 wt-% of the organic natural fiber materials are in the form of fibers. Additionally, the composite may comprise fines. According to an example 100 wt-% of the organic natural fiber materials are in the form of fibers.

The organic natural fiber material having a length of at least 0.1 mm, more preferably at least 0.2 mm and most preferably at least 0.3 mm may be called fibers, and smaller particles than those mentioned above may be called powder or fiber-like particles. Preferably at least 70%, at least 80% or at least 90% of the organic natural fiber material has a length weighted fiber length of under 4 mm, under 3 mm or under 2.5 mm, more preferably under 2.0 mm, under 1.5 mm, under 1.0 mm or under 0.5 mm. Preferably, at least 70 wt-%, at least 80 wt-%, or at least 90 wt-% of the organic natural fiber material has a length weighted fiber length of at least 0.1 mm or at least 0.2 mm, more preferably at least 0.3 mm or at least 0.4 mm. Advantageously, the fiber has a shape ratio relating to the ratio of the fiber length to the fiber thickness being at least 5, preferably at least 10, more preferably at least 25 and most preferably at least 40. In addition or alternatively, the fiber has a shape ratio relating to the ratio of the fiber length to the fiber thickness being preferably 1500 at the most, more preferably 1000 at the most, and most preferably 500 at the most. High shape ratio relates to reinforcing component with higher stiffness and impact strength for the same organic natural fiber material content. This can be described by modulus, for example Young's modulus or elastic modulus, which is a measure of the stiffness of a material and is used to characterize materials. The organic natural fiber material may form reinforcing components in the structure.

Figure 2:
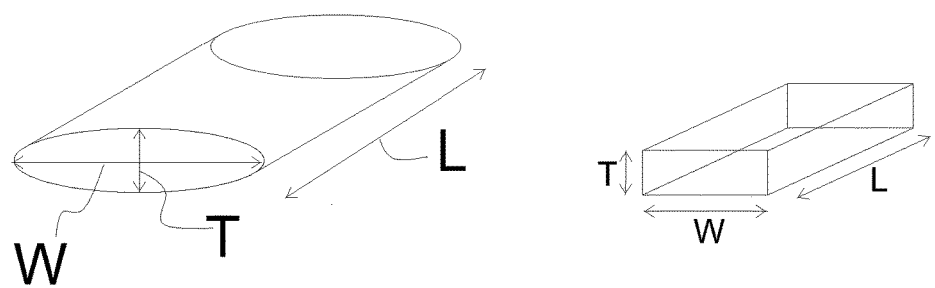
FIG. 2 illustrates an example of organic natural fiber based material in a form of a flake

Advantageously, the organic natural fiber material comprises fibers in a flake form. FIG. 2 illustrates an example of organic natural fiber material in a form of a flake. The flake of FIG. 2 comprises width W and thickness T, wherein the width is larger than the thickness. The flake of FIG. 2 comprises length L, which may be its widest dimension. The width W and thickness T may illustrate a cross section dimensions of the face of the flake. The face may be shaped oval-like or rectangular-like, as illustrated in FIG. 2, or the face of the flake may comprise a random shape. A random shape of the flake may continue along the flake length L. According to an embodiment cellulose fibers of the microstructure of a flake have been oriented along the length direction of the flake. Flakes may have a width that 2-10 times larger than the thickness of the fibers. Advantageously, the width of the flake is at least 2, preferably at least 2.5, and more preferable at least 3 times the thickness of the flake. Preferably, the flakes have a thickness between 1 micron and 30 micrometers and more preferably the thickness of flakes varies from 2 microns to 20 micrometers. Most preferably the thickness of flakes is 2-15 µm, more preferable 2-10 µm and most preferable 2-7 µm. In an embodiment, the width of the flake is 20-500 µm, preferably 20-200 µm, and more preferable 20-50 µm. Preferably, an aspect ratio relating to the ratio of the length to the width is between 10 and 100. Preferably, an aspect ratio relating to the ratio of the length to the thickness is 25-1500 or 25-1000, more preferable 25-500 and most preferably between 25 and 300. In an embodiment, the length of the flake is at least 10 times the width of the flake. In an embodiment the flake has a tubular shape. In one embodiment the flake has a platy shape. In one embodiment, the organic natural fiber material comprises flake form fiber material at least 30 dry wt-%, preferably at least 50 dry wt-%, or more preferably at least 70 dry wt-%, or most preferably at least 80 dry wt-% of the total amount of the organic natural fiber material. According to an example the organic natural fiber material contains flake-form fiber material 98 dry wt-%, or 100 dry wt-% of the total amount of the organic natural fiber material.

Figure 3:
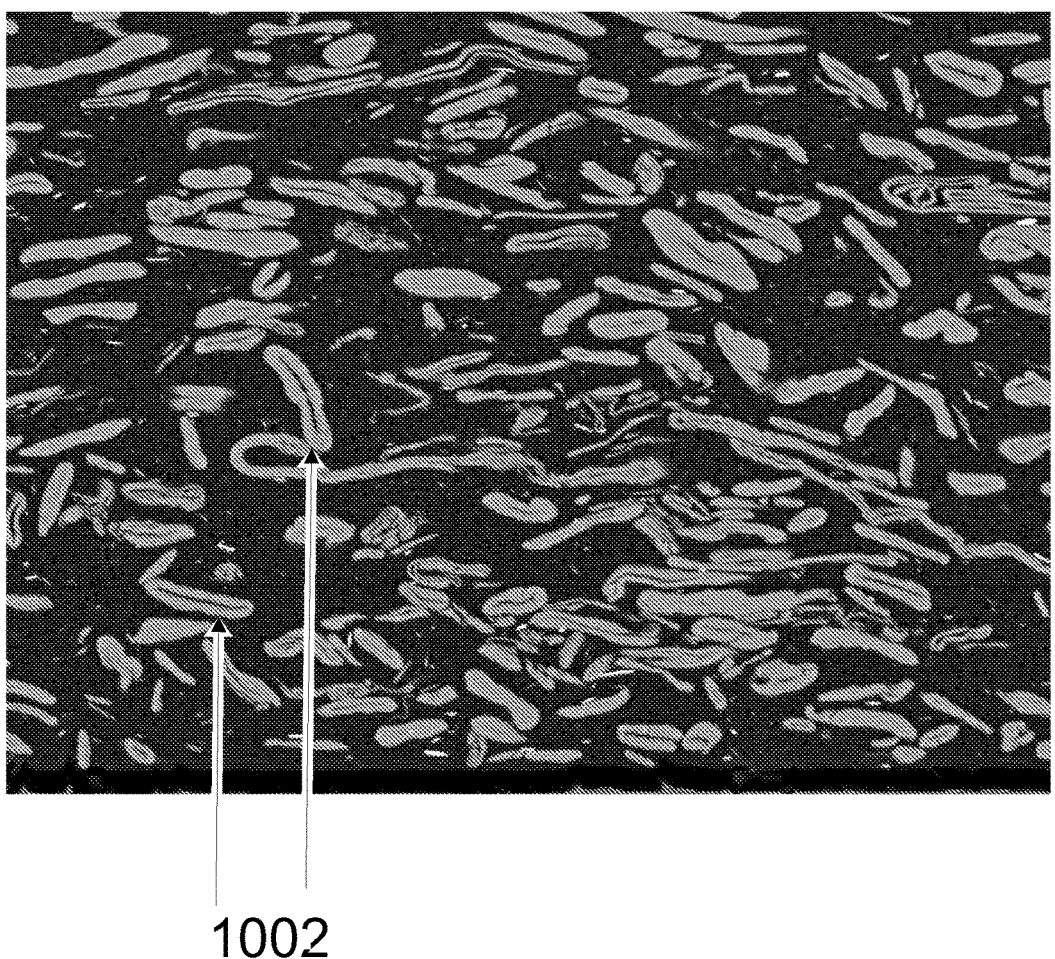
FIG. 3 illustrates magnified cross-sectional view of a composite according to an embodiment of the invention.

FIG. 3 illustrates a magnified cross-sectional view of a composite according to an embodiment of the invention. FIG. 3 has been captured using back-scattered electron (BSE) technology and 500 times magnification. The cross-sectional view of FIG. 3 comprises melt flow direction towards the image plane and at least most of the organic natural fibers 1002 are oriented accordingly. Lengthwise direction of the organic natural fibers is, at least approximately, orthogonal to the image plane. Organic natural fibers 1002 have tubular shape in lengthwise direction. Organic natural fibers 1002 have also tubular cross-section, as shown in FIG. 3. Instead of round cross-section, the cross-section of organic natural fibers 1002 is flattened towards platy shape. The cross-section of tubular organic natural fibers 1002 comprises a hollow interior. Advantageously, the hollow interior comprises platy shape, outlined by the tubular organic natural fiber. Cross-sectional profile, shape and/or volume of a hollow interior of an organic natural fiber 1002 may change across the fiber length. The hollow interior of a tubular organic natural fiber may comprise at least some water vapour, entrained air, gases, volatile components or matrix material, for example. According to an example, a tubular organic natural fiber is arranged to outline a hollow interior comprising air. The hollow interior may mean that the internal surface of the organic natural fiber remains at least in most parts untouched to itself. In a hollow structure interior walls of the organic natural fiber may contact with each other only loosely, if at all. A natural organic fiber may comprise slot or opening outlined by interior surface of the natural organic fiber. Form and dimensions of a hollow interior may differ among fibers and among composites. For example manufacturing method and adjustable parameters of it, like speed of extrusion or injection, temperature, pressure, may have effect on hollow structure of the organic natural fibers. Advantageously, at least 10-30 wt-%, or preferably at least 10-50 wt-%, or more preferably at least 10-70 wt-% of organic natural fibers 1002 comprise hollow interior outlined by organic natural fiber.

At least partly hollow organic natural fiber material may provide elastic and/or flexible micro- or nanoscale portions to a composite. The hollow organic natural fiber structure of a composite may have effect on damping and/or sound transmission properties of the composite. For example a composite comprising at least partly hollow natural fiber structure may comprise higher sound absorption coefficient compared to a composite comprising synthetic fiber or glass fiber, for example. This may be due to hardness and/or rigidity of a glass fiber and/or length of synthetic or glass fibers, which may lead to better sound transmission. A hollow, possibly platy or flattened organic natural fiber structure may have different sound transmission properties. The difference may be due to reflections and/or scattering of the sound at organic natural fiber interfaces. The hollow, possibly flattened, organic natural fiber component may not have straight lengthwise profile, but it may comprise bend, turned and/or twisted fiber portions. At least internal zone(s) of a composite (compared to surface zones) may comprise organic natural fibers having indirect lengthwise orientation. Orientation of organic natural fiber may be controlled, at least at surface zone(s) of a composite. Organic natural fiber material may comprise some linear stretch, whereas for example glass fibers mostly maintain their directions and/or dimensions during manufacturing phase of a composite. The composite comprising hollow non-oriented structural parts may have effect on damping sound.

Additives

A composite 100 may optionally comprise one or more additives. An additive may be comprised in a component and/or it may be combined to a component of a composite. For example, an additive may be bonded to a matrix material.

An additive may have effect of adjusting properties of the composite. An additive may comprise chain extenders, plasticizers, heat modifiers, impact modifiers, dispersion agents, coupling agents, lubrication agents and/or inorganic fillers, for example. The additives may comprise flow control additives, UV absorbers, fillers, metal particles, deglossing agents, pigments, antioxidants, flame retardants, diluents, stabilizers, monomers, prepolymers, flexibility improvers, processing aids and lubricants, fluoropolymer-based processing aids, mineral oils and waxes, nucleating agents, fiber strands, polymers, glass, ceramic and polymeric bubbles, metal particles, micro and nanofillers, core-shell particles, elastomeric micro and nanoparticles, magnetic and dielectric nanocrystals, carbon nanotubes, carbon nanofibers, nanographite, nanoclays, nanosilica, nanoalumina, zirconia and titania nanoparticles, noble metal and conductive nanoparticles, nanofibers and nanostrands or a combination thereof. Amount of additive(s) in a composite according to embodiments may be 0.1-30.0 wt-%. The amount is dependent on materials, application and desired properties. Preferable amounts of additive(s) of a composite may comprise 0.1-10.0 wt-%, or 0.1-5.0 wt-%, or 0.1-1.0 wt-%; or 0.5-30.0 wt-%, or 1.0-20.0. wt-%, or 5.0-15.0 wt-%.

Chain extenders may have effect of providing mechanical strength and melt strength to a structure. Melt strength may be advantageous during manufacturing and processing, for example enabling more stable processing. Chain extenders may enable recycling and re-use of composite. Examples of chain extenders are aromatic diols, aliphatic diols, carbon linear diols and carbon cyclic diols Melted chain extender may be added to preheated polymer matrix and mixed using high-speed mixer. After processing the mixture is arranged to a mold, where the mixture is heated, compression molded and optionally cured. Effect of chain extender may be improved hysteresis properties. This indicates that energy absorption is low and material will recover upon stretching. Another effect may be better hydrophobicity due to longer chains ($CH_2$) and more crystalline hard segments. Elastomers may exhibit crystalline transitions at appr. 50° C., that is an important feature in hot melt adhesive applications. Carbon linear and cyclic diols used in thermoplastic polyurethanes (TPU) may have effect of increasing hardness of a composite, providing higher modulus and/or enhanced water resistance. Effects of chain extenders may comprise improved heat resistance, resilience and improved moisture resistance. Effect of cyclic chain extenders may be providing soft materials with a high softening temperature. Products with higher hardness comprise higher modulus and compressive strength accordingly. Mechanical properties of polyurethane elastomers may be enhanced by use of chain extenders.

Plasticizers are additives that increase the plasticity or fluidity of a material. Plasticizers embed themselves between the chains of polymers, spacing the polymers apart. This way free volume in the structure is increased. The glass transition temperature of the material decreases and the material becomes softer. Increase in amount of plasticizer in a material decreases cold flex temperature of the material. Due to this, the material becomes more flexible and its durability increases. Plasticizer may comprise esters, which may include sebacates, adipates, terephthlates, dibenzoates, gluterates, phthalates, azelates, and other specialty blends. Plasticizer may be based on esters of polycarboxylic acids with linear or branched aliphatic alcohols, typically with moderate chain length. Example plasticizers comprise phthalate esters of straight-chain and branched-chain alkyl alcohols. Plasticizers may be chosen based on low toxity, compatibility with the host material, non-volatility and expense, for example. Examples of biodegradable plasticizers comprise alkyl citrates, like triethyl citrate (TEC), acetyl triethyl citrate (AATEC), tributyl citrate (TBC), acetyl tributyl citrate (ATBC), trioctyl citrate (TOC), acetyl trioctyl citrate (ATOC), trihexyl citrate (THC), acetyl trihexyl citrare (ATHC), butyryl trihexyl citrate (BTHC), trimethyl citrate (TMC). Phthalate-based plasticizers may provide good resistance to water. Examples of phthalate plasticizers comprise Diisooctyl phthalate (DIOP), Diethyl phthalate (DEP), Diisobutyl phthalate (DIBP), Butyl benzyl phthalate (BBzP), Di-n-butyl phthalate (DnBP, DBP). Plasticizers may have effect of adjusting flexibility, hardness and/or brittleness, and/or have positive effect on processing.

Heat modifier may be based on alpha methyl styrene (AMS) or polyphenylene ether (PPE). Heat modifier may have effect on heat distortion temperature. For example, poly-D-lactide homopolymer may be used to increase heat distortion temperature of poly-(L-lactic) acid. Heat modifiers may have effect of improving electrical and dimensional properties, toughness and/or flame resistance.

Polymer may be impact modified in order to satisfy end-use requirements for rigid applications. Impact modification may be implemented by adding rubber domains to the material. Polymers having substantially low stiffness and higher strength may be utilized. Examples of such polymers comprise at least one or more of thermoplastic olefin (TPO), thermoplastic elastomer (TPE), (poly-)styrene-ethylene butylene-styrene (SEBS), maleic-anhydride-grafted styrene-ethylene butylene-styrene (SEBS-MA), high impact polystyrene (HIPS), methylmethacrylate butadiene styrene (MBS)-based impact modifiers, acrylonitrile butadiene styrene (ABS)-based impact modifiers, ethylene vinyl acetate (EVA), ethylene butyl acetate (EBA) and their maleated terpolymers.

Dispersion agents may have effect of facilitating and/or stabilizing the dispersion of solid compounding materials, such as fillers or pigments, in a polymeric matrix. Dispersion agent may comprise surfactants, and/or be a non-surface active polymer or a surface active substance. Example of a dispersion agent is a silane. Dispersion agent may be added to a mixture, like suspension or colloid. Dispersion agents may have effect of improving separation of particles and/or preventing settling or clumping. Better dispersion has positive effect on processability and material properties.

A coupling agent or a compatibilizer refers to a compound that tends to promote dispersion and/or compatibilization of the organic natural fiber material and the polymer matrix. A coupling agent may comprise matrix material and a part, which is arranged to react with the organic natural fiber material. The matrix material of the coupling agent is comprised as part of the matrix material of the composite, although the matrix material of the coupling agent may not comprise pure matrix material. A coupling agent may be an amphiphilic component having effect of promoting and maintaining intimate contact between polar and non-polar components in a mixture. In other words, the coupling agent may be used to enhance the even dispersion of the organic natural fiber material to the polymer matrix, and to improve the interfacial adhesion between the non-polar polymer matrix and the polar organic natural fiber material during processing. The coupling agent may be employed as a grafted polymer surfactant, wherein a polymer backbone is modified to comprise at least one functional group that may be used for coupling a non-polar polymer matrix to polar organic natural fibers. A modified polymer may have been obtained, for example, by attaching a functional group into the polymer backbone. For example, a maleic anhydride may be an example of a compound suitable to be attached as a functional group into the polymer backbone, whereby maleic anhydride grafted polymer may be obtained. The coupling agent may comprise unsaturated carboxylic acids or unsaturated carboxylic acid anhydrides. For example, derivatives of unsaturated carboxylic acids, and mixtures thereof, or maleic anhydride may be used. Examples of such acids and anhydrides are mono-, di- or polycarboxylic acids such as acrylic acids, methacrylic acid, maleic acid, fumaric acid, itaconic acid, crotonic acid, itatonic anhydride, maleic anhydride and substituted maleic anhydride, e.g., dimethyl maleic anhydride or citrotonic anhydride, nadic anhydride, nadic methyl anhydride and tetrahydrophtahlic anhydride.

A coupling agent may have two functional domains; a first domain to form entanglements with the polymer matrix and a second domain to strongly interact with the organic natural fiber material. These interactions increase the interface adhesion between the polymer matrix and the organic natural fiber material. In other words, the composite may have been formed through a first coupling, such as covalent ester bonding, formed between the organic natural fiber material and the coupling agent and a second coupling, such as hydrogen bonding, formed between the coupling agent and the polymer matrix. Said coupling may, in addition to the covalent and hydrogen bonding, take a form of an entangled structure, where organic natural fibers are dispersed to a coupling agent. In other words, in addition to a chemical reaction taking place in the coupling, organic natural fiber(s) may be physically attached to a coupling agent that comprises an entangled polymer matrix. Said physical attachment may facilitate the forming of a stable structure. Coupling may occur also between a coupling agent that comprises a grafted thermoplastic polymer, such as a maleic anhydride grafted polymer, and a polymer matrix. Said coupling takes place through van der Waals-interactions and entanglements that are formed between the coupling agent and the polymer matrix. This type of bonding may have effect on providing a higher tensile strength of the composite.

The coupling agent may comprise a grafted thermoplastic polymer. Alternatively, the polymer matrix may comprise a grafted thermoplastic polymer. In addition, the coupling agent may comprise the polymer matrix. In other words, if the coupling agent comprises a thermoplastic polymer it may be used to replace the polymer matrix. As an example, the coupling agent may comprise maleic anhydride, also known as 2,5-furandione, dihydro-2,5-dioxofuran, toxilic anhydride or cis-butenedioic anhydride. Maleic anhydride may be provided to the process as a grafted polymer. The grafted polymer comprising a functional group, such as a maleic anhydride in the polymer backbone may be inactive unless sufficient amount of energy for the coupling between the coupling agent and the fibers to commence is provided. This can be done, for example, by heating to the material to an activation temperature where the coupling may begin. The coupling may be a chemical reaction, such as a covalent bonding. In other words, in order for the coupling agent to be activated a certain activation energy level may have to be reached, which is achieved by introducing sufficient amount of heat into the system. Once the activation energy level has been reached, coupling may be formed via a covalent bonding between a grafted polymer and an organic natural fiber material, to form a stable and durable structure.

Alternatively, the coupling agent may be formed by arranging an unsaturated carboxylic acid or an anhydride compound to react with a polymer to form a grafted compound through covalent bonding in the process of manufacturing organic natural fiber polymer composite.

Melt flow index for a coupling agent may be more than 0.1, or 0.1-2000, preferably 1.0-500, more preferably 2-200, most preferably 5-100, according to ISO 1133 (T 230° C., 2.16 kg). A composite according to embodiments may comprise 0.5-10.0 wt-%, or preferably 1.5-5.0 wt-%, or more preferably 2-3 wt-% of coupling agent. In an advantageous embodiment, the coupling agent comprises maleic anhydride based coupling agent. Amount of a maleic anhydride acid may be 0.2-8.0 wt-%, or preferably 1-3 wt-% of the coupling agent.

Coupling agents may have effect of providing bonding, or more stable bonding, between initially nonbonding and/or incompatible surfaces. For reinforced and filled plastics, the bonding between fibrous or other inorganic component and organic matrix polymer has effect on composite strength and/or its operating life. Coupling agent may have effect on damping properties and modulus of a composite according to embodiments. Further the coupling agent may have effect on mechanical properties of a composite, like stiffness.

Lubricants are additives that may be used in production of organic natural fiber polymer composite structures in order to control and increase output rate. The lubricants may be called as a process aids, release agents or slip agents. The lubricants may be for example metal ion comprising substances, such as stearic acid salts (stearates), or synthetic waxes, which are free of metal ions. Lubrication and release properties, as well as water repellence, are characteristics of metallic stearates. The special effects of these properties are determined by the cation (metal ion), the chain length of the fatty acid and certain other properties, such as the water of crystallisation content, of the respective metallic stearate. Metal ions suitable for stearates can be, for example, but not limited to, zinc, calcium, magnesium, barium, natrium, kalium or aluminium. Stearates may also contain a combination of one or more of these metal ions or similar ones. Carboxylic acid esters or ethers may be preferred as lubricants for a composite comprising organic natural fiber material, since stearates may interfere coupling agents in the composite.

The lubricants used in production of polymer composites comprising organic natural fiber material may be distinguished as either internal or external lubricants. Internal lubricants reduce the internal friction, improve the flow properties and the homogeneity of the melt, make fibers slip and the mixture form more easily. They may be soluble or partially soluble in a polymer and may settle on the interface of agglomerates, pigments or polymer chains. A non-limiting example listing of internal lubricants comprises fatty acids, esters of long-chain fatty acids, polyethylene waxes and white oils. External lubricants reduce the friction of the material in contact with the wall of the processing machine, reduce the friction of the particles among themselves and the adhesion of the polymer melt on the tool. Because of its insoluble properties in plastics the external lubricant may migrate to the surface during the processing action, accumulate there and act as a lubricant, which may additionally increase the smoothness and the gloss of the surface of the end product. A non-limiting example listing of external lubricants comprises metal stearates, fatty acid amide esters, silicon oils, paraffin oils, and glycols.

The lubricant to be used may be a blend of compounds, for example aliphatic carboxylic acid salts and mono and diamines. The preferred amounts to produce desired effects may contain lubricant equal to or less than 5.0 wt-%, such as 4.0 wt-%, 3.0 wt-%, 2.0 wt-%, 1.0 wt-%, 0.5 wt-% or 0.3 wt-% of the composite. Preferably lubricant may be added 0.01-5.00 wt-%, preferably 0.05-3.00 wt-% of the composite.

Inorganic fillers may have effect of increasing stiffness properties of a product. Inorganic fillers are optional part of the composite. Use depends on application and properties, among others. The amount of the inorganic fillers in the composite comprising organic natural fiber material may be between 0 and 40 wt-% or preferably 1-20 wt-%. The inorganic fillers may comprise talc, mica, kaolin, calcium carbonate, fly ash, mica, glass fibers, carbon fibers, titanium dioxide ($TiO_2$). According to at least some embodiments, at least 50 wt-% of the fillers comprise one or more inorganic fillers. In addition, other organic fillers, like any suitable polymeric fiber, may be used. The composite comprising organic natural fiber material may be coloured, for example, by using pigments. Inorganic fillers of a composite according to embodiments may comprise potassium carbonate ($CaCO_3$) and/or talc. The composite may comprise talc and/or potassium carbonate 1-40 wt-%, or preferably 1-20 wt-%. Inorganic fillers, like talc or potassium carbonate, may provide effect of adjusting damping properties of the composite.

As an example, carbon fibers and glass fiber may be used as an additive in order to enhance mechanical properties of a composite. Aramid fiber may be used as an additive in order to enhance wear resistance of a composite. Graphite powder may be used as an additive in order to enhance moisture resistance of a composite. Molybdenum sulphide ($MoS_2$) may be used as an additive in order to harden surface of a composite.

Minor amounts of thermosetting resins or other residues, such as polyurethane, may be present in the polymer compositions without sacrificing the thermoplastic properties.

Variables

Acoustic properties of a material are important for many applications. The mechanical vibrations that can be interpreted as sound may be transmitted as longitudinal waves. Through solids, however, sound may be transmitted as both longitudinal waves and transverse waves. Transverse sound waves in solids are waves of alternating shear stress at right angle to the direction of propagation. In solid materials the medium may be periodically displaced by a sound wave, and thus made to oscillate. Sound may be characterized by the frequency, wavelength, amplitude, intensity and speed in different materials.

Composite comprising organic natural fiber material according to embodiments provides good sound and high sound intensity. It comprises high modulus and still reasonably low density. Acoustical performance of a material is influenced by its density $\rho$, modulus E, and factor of viscous damping $\delta$. Density of a solid may be calculated as mass by a unit volume, $$\rho = m/V$$

where m=mass, V=volume and $\rho$=density. Thermal expansion or foaming, which increase the volume, typically decrease the density. Acoustic properties of materials include impedance, also known as sound wave resistance, and sound radiation coefficient, also known as damping of sound radiation. The sound wave resistance Z and damping of sound radiation $\theta$ are defined as:

$$Z = \sqrt{\rho \cdot E}$$

$$\vartheta = \frac{\sqrt{E/\rho}}{\rho}$$

As an example the quantities of sound wave resistance Z and damping of sound radiation $\theta$ are determined from dynamically measured modulus of a material. The dynamic modulus may be measured by dynamic mechanical analysis using dynamic mechanical thermal analysis (DMTA) equipment, wherein the modulus is commonly expressed as the storage modulus E'. In other example the dynamic modulus may be measured according to ISO 6721-3, which defines a measurement based on flexural vibrations resonance curve method. Alternatively, dynamic modulus may be determined from modal analysis of a material. The method of modal analysis of the material may be preferred, since it is possible to determine the characteristic frequency and the factor of viscous damping δ in a single measurement. Dynamic and modal measurements illustrate well acoustic properties of a material. This is due to measurement frequencies being close or equal to the frequencies of audible sound waves and/or frequency being dynamic process, for example. Thus relative and/or dynamic and/or modal values may be advantageous for measuring acoustic properties.

When using modal analysis to measure the differences in the acoustic response of square-shaped plates from different materials, following equation can be used. Equation includes frequency of n-th mode $f_n$ and mechanical properties of homogeneous, isotropic and free-supported square-shaped plates:

$$f_n = C_n \cdot t \cdot \sqrt{\frac{E}{\rho \cdot (1-v)^2 \cdot l^4}}$$

where $C_n$ is a constant which depends on n-th mode, t is plate thickness, v is Poisson's ratio, and l is length (width) of the plate. In the analysis and examples which follows, only the (relevant) first mode of all specimens was analyzed. The largest displacements for this mode are in the middle of the plate. The amplitudes of displacements diminish towards the plate's edges. Thus, when the specimen is excited in its geometrical center, the first mode is excited as much as possible. Quantity $f_n$ is measured, and t, l, v and ρ are exactly or approximately known. Based on equation for a first mode it follows:

$$E = \frac{1}{C_1^2} \cdot \frac{f_1^2 \cdot \rho \cdot (1-v^2) \cdot l^4}{t^2}$$

Because in the following analysis and examples a relative comparison of quantities is presented, it is reasonable to exclude from the previous expression constant $C_1$ and dimensions of all quantities. Instead of quantity E, consequently, dimensionless relative dynamic modulus of elasticity $E_{rel}$ is obtained:

$$E_{rel} = \frac{f_1^2 \cdot \rho \cdot (1-v^2) \cdot l^4}{t^2}$$

When the dynamic modulus is determined by modal analysis of the first mode the measured and calculated quantities can be expressed as relative values $E_{rel}$, $Z_{rel}$, and $\theta_{rel}$.

$$Z_{rel} = \frac{\sqrt{\rho \cdot E_{rel}}}{10^3}$$

$$\theta_{rel} = \frac{\sqrt{E_{rel}/\rho}}{\rho}$$

Relative factor of viscous damping $\delta_{rel}$ is obtained from the first mode resonance frequency as follows:

$$\delta_{rel} = \frac{1}{2} \cdot \frac{f_2 - f_1}{f_{0d}},$$

where $f_{0d}$ is the first mode resonance frequency (with peak amplitude P) and $f_1$ and $f_2$ have an amplitude of P/√2.

In any acoustic application there will be an optimum balance of the relative sound wave resistance $Z_{rel}$ (or Z) and relative damping of sound radiation $\theta_{rel}$ (or θ), and the relative factor of viscous damping $\delta_{rel}$ (or δ) for the selected material in a specific application. For example, soundboard of an instrument requires high damping of sound radiation θ. On the other hand, an enclosure for a loudspeaker may require clearly lower level of damping of sound radiation and optimized levels of sound wave resistance and factor of viscous damping of the enclosure material.

A relative acoustic quality factor $Q_{rel}$ for a material may be expressed as follows:

$$Q_{rel} = \frac{Z_{rel} \cdot \delta_{rel}^2}{\theta_{rel}^2} \cdot 100$$

In calculations of a relative sound wave resistance $Z_{rel}$ and a relative damping of sound radiation $\theta_{rel}$ the density has unit of kg/m³ and the relative dynamic modulus of elasticity $E_{rel}$ has unit of Pa or its dimensionless counterpart. The relative sound wave resistance $Z_{rel}$ has been divided by $10^3$ in order to scale the values for the calculations, and those values of a relative sound wave resistance $Z_{rel}$ are referred in the description and tables herein. The Poisson's ratio v is approximated for the materials and for any composite comprising thermoplastic polymer and organic natural based fiber a constant value of 0.3 is used in the calculations.

Table 1 shows example values for certain composites. Matrix material of the examples comprises polypropylene. Amount of organic natural fiber material in the composite is presented in second column. For comparison the measurements are made also for a polypropylene without organic natural fiber material, for a wood based board and for a plywood. The measurements have been made from injection molded test specimens except for the wood based board and plywood. Measurements were performed at 22° C. and 45% relative humidity (RH).

Table 1 shows example values of specific modulus measured using density and modulus. Example density values used for measurements are based on ISO 1183-1 test method. Example modulus values are measured according to ISO 527-2 test method (50 mm/min). Injection molded tensile test specimens have been used a composite according to embodiments. With the previous equations it is possible to calculate values for a relative sound wave resistance $Z_{rel}$ a relative damping of sound radiation $\theta_{rel}$ and a relative acoustic quality factor $Q_{rel}$.

TABLE 1

| Matrix material | Organic natural fiber [wt-%] | Specific modulus [MPa/(g/cm³)] | Relative dynamic modulus of elasticity, ($E_{rel}$) [·10⁶] | Relative factor of viscous damping ($\delta_{rel}$) | Relative sound wave resistance ($Z_{rel}$) | Relative damping of sound radiation ($\theta_{rel}$) | Relative quality factor ($Q_{rel}$) |
|---|---|---|---|---|---|---|---|
| Polypropylene | 20 | 2066 | 4383 | 0.024 | 2083 | 2.13 | 26.6 |
| Polypropylene | 30 | 2761 | 5648 | 0.022 | 2412 | 2.27 | 22.1 |
| Polypropylene | 40 | 3421 | 6589 | 0.023 | 2668 | 2.29 | 27.0 |
| Polypropylene | 50 | 4039 | 6946 | 0.023 | 2802 | 2.19 | 30.8 |
| polypropylene |  | 1400 | 2849 | 0.026 | 1610 | 1.94 | 28.8 |
| wood based board |  | 5192 | 4895 | 0.018 | 1884 | 3.59 | 4.7 |
| plywood |  | 22562 | 14049 | 0.009 | 3102 | 6.60 | 0.6 |

The specific modulus of a composite material comprising organic natural fiber material may be above 1000 MPa/(g/cm³). For example, the specific modulus of a composite material comprising organic natural fiber material may be above 2000 MPa/(g/cm³) or 2300 MPa/(g/cm³). In some applications the specific modulus of a composite material comprising organic natural fiber material may be above 2500 MPa/(g/cm³) or above 3500 MPa/(g/cm³), advantageously above 4500 MPa/(g/cm³), and preferably above 5000 MPa/(g/cm³) or above 6000 MPa/(g/cm³). In an embodiment, the specific modulus of a composite material comprising organic natural fiber material may be 2000-7000 MPa/(g/cm³), or preferably 3000-6000 MPa/(g/cm³), or more preferably 4000-5500 MPa/(g/cm³).

Dynamic modulus may be measured by dynamic mechanical analysis using dynamic mechanical thermal analysis (DMTA) equipment, or according to ISO 6721-3, which defines a measurement based on flexural vibrations resonance curve method. Alternatively, dynamic modulus may be determined from modal analysis of a material. For the examples values shown in table 1 injection molded plates of the studied materials were prepared. The square plate dimensions were approximately 150 mm×150 mm with 3.3 mm thickness. The suspended plate was mechanically excited in the first modal point of the plate, i.e. in the middle of the plate, and signal analysis were employed to derive the values for first mode frequency $f_1$, and relative factor of viscous damping $\delta$. For example for the material comprising polypropylene matrix and 20 wt-% organic natural based fiber the values for the first mode frequency $f_1$ and relative factor of viscous damping $\delta$ were 337.9 Hz and 0.024, respectively. Values have been measured with the described method of modal analysis and previous equations. A dynamic modulus, measured according to ISO 6721-3, for a composite according to embodiments may be 2000-11000, or preferably 2800-9000, or more preferably 3500-7500, or most preferably 4000-7000. In an example, a dynamic modulus for a composite according to embodiments is 6500, when measured according to ISO 6721-3.

Sound wave resistance may also be called an impedance. If sound wave resistance, is high, energy transmitted for example to a loudspeaker casing may be insufficient. This may lead to formation of echoes and standing waves. If sound wave resistance is low, energy transmitted to loudspeaker casing may be fast leading and short-lasting. This may lead to distinctive resonance or frequencies and/or high sound energy losses. The sound wave resistance shall be optimized according to application. For a loudspeaker casing sound wave resistance shall not be too high, nor too low for optimized acoustic quality. A relative sound wave resistance of a composite according to embodiments may be 1500-5000, or preferably 1900-4500, or more preferably 2500-4000, or most more preferably 2800-3200, for example 3000. In another embodiment a relative sound wave resistance of a composite according to embodiments may be 1500-5000, or preferably 2000-4500, or more preferably 2300-2700, for example 2500. Sound wave resistance is related to material's density and elastic modulus.

Density and elastic modulus have an effect on damping of the sound radiation. Damping of sound radiation illustrates ability to radiate sound energy into surroundings. Damping of sound radiation may be adjusted according to application. For loudspeaker casings it shall be low, whereas for musical instruments sound radiation damping shall be high. A relative damping of sound radiation of a composite according to embodiments may be 1.5-5.0, or preferably 2.0-4.5, or more preferably 2.1-3.5, or most preferably 2.2-2.8. In an embodiment, a relative damping of sound radiation of a composite according to embodiments may be 1.5-5.0, or preferably 2.0-4.5, or more preferably 3.0-4.0, or most preferably 3.2-3.8. For example a relative damping of sound radiation for a composite comprising organic natural fiber material, which composite has been designed for a guitar body, may be in order of 3-15.

The acoustical properties and relative acoustic quality factor $Q_{rel}$ for a composite comprising organic natural fiber material may be measured according to ISO 6721-3. The acoustical properties and relative acoustic quality factor $Q_{rel}$ for a composite comprising organic natural fiber may be measured by another type of dynamic mechanical analysis. The relative acoustic quality factor for a composite comprising organic natural fiber material may be 5-200, or preferably 8-100, or more preferably 15-50, or most preferably 20-45, for example 30. In an embodiment the relative acoustic quality factor for a composite comprising organic natural fiber material may be 5-200, or preferably 10-150, or more preferably 25-100, or most preferably 40-80, for example 60.

A composite comprising polymer material and organic natural fiber material has effect of providing low density with high modulus. Density and tensile modulus may increase as a function of cellulose weight percent. Because the tensile modulus (E) increases faster than the density ($\rho$), and also the specific modulus (E/$\rho$) increases.

Loss coefficient refers to the dissipation of some of the mechanical energy of vibration as heat by internal friction.

The internal friction has effect on damping of vibration, since the internal friction is independent of density and modulus.

Low loss of sound energy relates to low viscous damping. A composite comprising organic natural fiber material may provide good value of viscous damping. These properties have effect on sound wave resistance and damping of sound radiation. Ratio of elastic and loss modulus of the composite has effect on viscous damping factor. Energy transfer in the composite and energy absorbing may be adjusted. Material choices have effect on amplitude, damping and modal shapes at certain frequencies of vibration.

Elasticity and density have effect on specific modulus, which relates to stiffness. Example values of elastic modulus are for polypropylene 1.1-2 GPa, for polystyrene 3-3.5 GPa, for medium-density fiberboard (MDF) 4 GPa, for pine (along grain) 9 GPa, for hemp fiber 35 GPa, for flax fiber 58 GPa, for aluminium 69 GPa, for glass-reinforced plastic comprising 70 wt-% of fiber (unidirectional, along grain) 40-45 GPa, for glass-reinforced polyester matrix 17.2 GPa, for carbon-fiber reinforced plastic comprising 50 wt-% of fiber (biaxial) 30-50 GPa, for carbon-fiber reinforced plastic comprising 70 wt-% of fiber (unidirectional, along grain) 181 GPa.

The speed with which sound travels through a material may be defined as a root of the material's modulus divided by the material's density. The speed of longitudinal waves in a material may also characterize the transverse vibrational frequencies. Sound wave resistance of a material, or impedance, refers to the product of the material's speed of sound and its density. The speed of sound is therefore directly related to the elastic modulus and density.

The sound in a material may propagate in more than one direction. In an isotropic material the speed of sound is substantially the same in every direction. In an anisotropic material the speed of sound is directionally dependent. For example in at least some composites comprising organic natural fiber material the speed of sound may differ along the direction of the melt flow and the direction perpendicular to it, called cross direction. Direction of the fiber orientation corresponds to that of the melt flow. The speed of sound in a cross direction may be one third of the speed of sound in the direction of the melt flow.

According to an embodiment speed of sound in a cross direction may be 10%, or 20%, or 30% smaller than speed of sound in a melt flow direction. Advantageously, speed of sound in a cross direction may be 35%, or 40%, or 50% smaller than speed of sound in a melt flow direction. In some embodiments, the speed of sound in a cross direction is preferably 60%, or 70%, or 80% smaller than speed of sound in a melt flow direction.

The speed of sound in a melt flow direction may be up to or above 2000 m/s. By selecting the composition of the composite comprising organic natural fiber material the speed of sound may be controlled. The speed of sound may be selected to be equal to or less than 2000 m/s, for example between 2000 m/s and 800 m/s, such as between 1800 m/s and 1000 m/s. Alternatively, the speed of sound may be selected to be equal to or more than 2000 m/s, for example between 2000 m/s and 3800 m/s, such as between 2000 m/s and 3000 m/s.

For example, specific modulus for a loudspeaker material may be 4.0 MPa/(g/cm$^3$). A relative sound wave resistance, measured using any dynamic method, for a loudspeaker material may be 1500-5000; preferably 2000-4500; or more preferably 2300-2700. Relative damping of sound radiation for a loudspeaker material may be 1.5-5.0; or preferably 2.0-4.5; or more preferably 3-4. Relative acoustic quality factor, measured using modal analysis, for a loudspeaker may be 5-200; or preferably 10-150; or more preferably 20-80; or most preferably 15-80.

For instrument soundboards a relative damping of sound radiation, measured using any dynamic method, may be more than 2.0; or preferably less than 5.0; or more preferably less than 10.0. Relative factor of viscous damping or loss coefficient for a soundboard, measured using any dynamic method, may be 0.500-0.005, preferably 0.20-0.01, more preferably 0.20-0.02, for example 0.025. According to a preferred embodiment a relative factor for a viscous damping is less than 0.20, preferably less than 0.04, for example 0.005.

Example 1

A composite material comprising 50 wt-% of organic natural fiber material, appropriately selected polypropylene matrix and additives was injection molded into a plate with dimensions of 149×149×3.3 mm. The density of the material was 1.11 g/cm$^3$. Modal analysis was performed on the plate as described earlier and the measured first mode frequency $f_n$ and the relative factor of viscous damping δ were 435 Hz and 0.024, respectively.

The values for relative sound wave resistance $Z_{rel}$, relative damping of sound radiation $\theta_{rel}$, and relative acoustic quality factor $Q_{rel}$ were 3099, 2.52, and 28, respectively.

Example 2

The composite material in example 1 was modified so that the density was reduced to 0.99 g/cm$^3$ and the dynamic modulus of the material increased slightly. The material was injection molded into a plate with dimensions of 149×149×3.3 mm. Modal analysis was performed on the plate as described earlier and the measured first mode frequency $f_n$ and the relative factor of viscous damping δ were 475 Hz and 0.024, respectively.

The values for relative sound wave resistance $Z_{rel}$, relative damping of sound radiation $\theta_{rel}$, and relative acoustic quality factor $Q_{rel}$ were 3018, 3.08, and 18, respectively.

Example 3

A composite material comprising 40% natural fiber material, appropriately selected polypropylene matrix and additives was injection molded into a plate with dimensions of 149×149×3.3 mm. The additives were selected so that the density of the molded material was reduced to 0.92 g/cm$^3$ while the dynamic modulus of the material was not considerably changed by the reduction of the density. Modal analysis was performed on the plate as described earlier and the measured first mode frequency $f_n$ and the relative factor of viscous damping δ were 425 Hz and 0.024, respectively.

The values for relative sound wave resistance $Z_{rel}$, relative damping of sound radiation $\theta_{rel}$, and relative acoustic quality factor $Q_{rel}$ were 2509, 2.96, and 16, respectively.

Example 4

A composite material comprising 30% natural fiber material, appropriately selected polypropylene matrix and additives was injection molded into a plate with dimensions of 149×149×3.3 mm. The additives were selected so that the density of the molded material was reduced to 0.855 g/cm$^3$ and the dynamic modulus of the material remained at high level. Modal analysis was performed on the plate as described earlier and the measured first mode frequency $f_n$ and the relative factor of viscous damping δ were 465 Hz and 0.030, respectively.

The values for relative sound wave resistance $Z_{rel}$, relative damping of sound radiation $θ_{rel}$, and relative acoustic quality factor $Q_{rel}$ were 2552, 3.49, and 19, respectively.

Example 5

A composite material comprising 20% natural fiber material, appropriately selected polypropylene matrix and additives was injection molded into a plate with dimensions of 149×149×3.3 mm. The density of the molded material was 0.99 g/cm³. Modal analysis was performed on the plate as described earlier and the measured first mode frequency $f_n$ and the relative factor of viscous damping δ were 315 Hz and 0.025, respectively.

The values for relative sound wave resistance $Z_{rel}$, relative damping of sound radiation $θ_{rel}$, and relative acoustic quality factor $Q_{rel}$ were 2001, 2.04, and 30, respectively.

Example 6

A composite material comprising 60% natural fiber material, appropriately selected polypropylene matrix and additives was injection molded into a plate with dimensions of 149×149×3.3 mm. The density of the material was 1.19 g/cm³. Modal analysis was performed on the plate as described earlier and the measured first mode frequency $f_n$ and the relative factor of viscous damping δ were 462 Hz and 0.020, respectively.

The values for relative sound wave resistance $Z_{rel}$, relative damping of sound radiation $θ_{rel}$, and relative acoustic quality factor $Q_{rel}$ were 3528, 2.49, and 23, respectively.

Example 7

A composite material comprising 15% natural fiber material, appropriately selected polypropylene matrix and additives was injection molded into a plate with dimensions of 149×149×3.3 mm. The density of the material was 0.98 g/cm³. Modal analysis was performed on the plate as described earlier and the measured first mode frequency $f_n$ and the relative factor of viscous damping δ were 230 Hz and 0.010, respectively.

The values for relative sound wave resistance $Z_{rel}$, relative damping of sound radiation $θ_{rel}$, and relative acoustic quality factor $Q_{rel}$ were 1447, 1.51, and 6, respectively.

Example 8

A composite material comprising 30% natural fiber material, appropriately selected polypropylene matrix and additives that provides enhanced stiffness and damping was injection molded into a plate with dimensions of 149×149×3.3 mm. The density of the material was 0.95 g/cm³. Modal analysis was performed on the plate as described earlier and the measured first mode frequency $f_n$ and the relative factor of viscous damping δ were 740 Hz and 0.050, respectively.

The values for relative sound wave resistance $Z_{rel}$, relative damping of sound radiation $θ_{rel}$, and relative acoustic quality factor $Q_{rel}$ were 4512, 5.00, and 45, respectively.

Example 9

A composite material comprising 60% natural fiber material, 10% inorganic filler, appropriately selected polypropylene matrix and additives was injection molded into a plate with dimensions of 149×149×3.3 mm. The density of the material was 1.30 g/cm³. Modal analysis was performed on the plate as described earlier and the measured first mode frequency $f_n$ and the relative factor of viscous damping δ were 530 Hz and 0.032, respectively.

The values for relative sound wave resistance $Z_{rel}$, relative damping of sound radiation $θ_{rel}$, and relative acoustic quality factor $Q_{rel}$ were 4422, 2.62, and 66, respectively.

Example 10

A composite material comprising 30% natural fiber material, 10% inorganic filler, appropriately selected thermoplastic polymer matrix and additives was injection molded into a plate with dimensions of 149×149×3.3 mm. The density of the material was 1.40 g/cm³. Modal analysis was performed on the plate as described earlier and the measured first mode frequency $f_n$ and the relative factor of viscous damping δ were 500 Hz and 0.015, respectively.

The values for relative sound wave resistance $Z_{rel}$, relative damping of sound radiation $θ_{rel}$, and relative acoustic quality factor $Q_{rel}$ were 4492, 2.29, and 19, respectively.

Properties

Mechanical properties of composite products depend on many aspects. For example, choice of materials, their ratio in the composite and their interaction.

Matrix material of a composite is selected according to application and/or end use. The selected matrix material is also suitable for the used manufacturing method. Naturally interaction of materials and possible additives has effect on the composite, the end product and their properties. Matrix material properties change during processing. For example crystallization of the matrix material may alter due to presence of organic natural fiber material. Composition comprising matrix material and organic natural fiber material may have different properties than the original matrix material. In the following some properties of polymers, which may be used for selecting the polymer and have effect on their use and processing, are described.

At least some of polyethylenes are light-weight, cheap, hard and stiff polymers. Polyethylene may be used with an additive to enhance its adherence and/or sticking. Polypropylene homopolymer is light-weight, hard and rigid, but may not stand low temperatures (below 0° C.) without fractions. Polypropylene comprises stiffness and relatively low density, which may be advantageous for many applications. Copolymer polypropylene maintains its properties also in lower temperatures, e.g. from −25° C., or from −20° C. Polyester is weather resistant and stiff, which stiffness may be further enhanced with additives. Polyacetal (POM) and polyamide (PA) have low friction against steel. Polyacetal keeps its dimensions well in different circumstances, is flexible and viscous. Polyamide is stiff and comprises fiber-like structure. Polyimide withstands high temperatures. For example shape may be stabilized so that it does not change, but withstands even high temperatures (over 200° C.), by using polyamide-imide. Polycarbonate is durable, especially shock-proof. Polystyrene may be rigid, clear (radiant), and comprise good resistance to heat and better paintability compared to for example polyolefins. Polylactic acid may be rigid, biodegradable and match well with organic natural fiber material. Polylactic acid and polyethylene comprise suitable processing temperature range matching with the processing temperature range(s) of the organic natural fiber material.

In addition to polymer, the composite comprises organic natural fiber material. Fiber content of a composite may be 5-75 wt-%, or preferably 20-70 wt-%, or more preferably 30-60 wt-%, or most preferably 40-50 wt-%. Fiber content of a composite may be 5-75 wt-%, or more preferably 10-40 wt-%, or most preferably 20-30 wt-%. Fiber type, fiber properties, fiber content, fiber length, dispersion, and adhesion between fibers and matrix material may have an effect on mechanical properties of the product. The stiffness of the composite product may increase when organic natural fiber materials are added to the matrix material. Organic natural fiber material may have effect of increasing stiffness and/or strength of the composite. Lightweight, optimized stiffness and optimized acoustic damping may be achieved with the composite material according to embodiments. Further at manufacturing phase improved flow characteristics are often desired, especially for thin products. Weight percentage of organic natural fiber material may have effect on stiffness such that increasing weight percentage of organic natural fiber material results in increased stiffness. A relatively small weight percentage of organic natural fiber material in a composite may provide desired change in stiffness, and/or desired damping at equivalent stiffness. Alternatively or additionally shape ratio of organic natural fibers may have effect on stiffness. In many applications high shape ratio of organic natural fibers is desired.

Advantageously, the fiber has a shape ratio relating to the ratio of the fiber length to the fiber thickness being at least 5, preferably at least 10, more preferably at least 25 and most preferably at least 40. In addition or alternatively, the fiber has a shape ratio relating to the ratio of the fiber length to the fiber thickness being preferably 1500 at the most, more preferably 1000 at the most, and most preferably 500 at the most. High shape ratio has, at least in part, effect to reinforcing component with higher stiffness and impact strength for the same organic natural fiber material content. Alternatively or additionally longer fibers, like glass fibers or carbon fibers, may be used to effect stiffness of the composite. This may be described by modulus, for example elastic modulus, which is a measure of stiffness of a material and is used to characterize materials.

The fiber material may comprise chemically treated organic natural fiber material, such as organic natural fiber material from a kraft process. The kraft process reduces the lignin content of the organic natural material. While lignin may function as an adhesive material between the fibers, it may at the same time isolate the fibers from the surroundings and hinder the settling of the fiber components during composite manufacturing. Advantageously, the content of lignin in the fiber material may be reduced by a chemical process to under 15 wt-%, preferably under 5 wt-%, more preferably under 1 wt-% and most preferably under 0.5 wt-%. The organic natural fiber material may have a low lignin content and be used for a composite structure comprising flattened and/or oriented fibers.

At least some/all embodiments the composite comprising organic natural fiber material may have effect of providing stiffness and rigidity for structures and/or applications, without a significant increase in density of the composite and structures and/or applications thereof. The composite according to embodiments may have effect of providing rigid composite or component of low weight. In comparison, some prior art matrix materials, which comprise additives, like starch or glass fibres, for providing rigidity, also comprise density increasing analogously with the amount of the additive(s). The composite according to embodiments may provide effect of providing desired acoustic properties for variety of applications, for example for loudspeaker casing and/or other parts thereof, for acoustic panels, for musical instruments, for cars.

Desired properties may be achieved for variety of applications by adjusting origin materials and their properties. For example moisture absorbing may be adjusted. In an embodiment a composite product comprises 60-80 wt-% of organic natural fiber material, and a dry composite product absorbs moisture under 1.9% of the weight of the composite product in 30 hours (50% RH and 22° C. atmosphere). When the composite product comprises 60-80 wt-% of the organic natural fiber material, and a dry composite product absorbs moisture under 1.9%, preferably under 1.5%, and more preferable under 1.0%) of the weight of the composite product in 30 hours (50% RH and 22° C. atmosphere).

In another embodiment a composite product comprising 40-60 wt-% of organic natural fiber material, and a dry composite product absorbs moisture under 1.5% of the weight of the composite product in 30 hours (50% RH and 22° C. atmosphere). When the composite product comprises 40-60 wt-% the organic natural fiber material, a dry composite product absorbs moisture under 1.5%, preferably under 1.0%. and more preferably under 0.8 of the weight of the composite product in 30 hours (50% RH and 22° C. atmosphere).

In yet another embodiment a composite product comprises 20-40 wt-% of organic natural fiber material, and a dry composite product absorbs moisture under 1.3% of the weight of the composite product in 30 hours (50% RH and 22° C. atmosphere). When the composite product comprises 20-40 wt-% of the organic natural fiber material, a dry composite product absorbs moisture under 1.3%, preferably under 0.8, and more preferably under 0.5 of the weight of the composite product in 30 hours (50% RH and 22° C. atmosphere).

In still another embodiment a composite product comprises 10-20 wt-% of organic natural fiber material, and a dry composite product absorbs moisture under 1.2% of the weight of the composite product in 30 hours (50% RH and 22° C. atmosphere). When the composite product comprises 10-20 wt-% of the organic natural fiber material, a dry composite product absorbs moisture under 1.1%, preferably under 0.7, and more preferably under 0.4 from the weight of the composite product in 30 hours (50% RH and 22° C. atmosphere).

In an embodiment moisture uptake from the atmosphere can be measured from the dry composite products. Before the measurement the composite products is dried. The composite product should be dried at temperature of 120° C. for 48 hours before the measurement. In most cases the drying temperature should be at least 10° C. lower than a glass transition temperature or a melting temperature of the polymer. If the drying temperature is lower than 110° C., drying temperature shall be as high as possible, drying preferably accomplished at a vacuum oven (vacuum level preferable below 0.01 mbar), and using drying time of 48 hours. For a moisture uptake measurement at least 10 grams of products will be placed on a plate. There should be only one granulate layer on the plate. The moisture uptake is then measured as a weight increase compared to the weight of dry products. If the weight of a dry composite product is increased from 10.0 g to 10.1 g, the result is 1.0%. The measurements are accomplished in conditions of 22° C. temperature and 50% RH air moisture. Different measurement times may be used.

Thermal Expansion

Thermal expansion is a feature specific to materials. Each material has a specific thermal expansion coefficient, which determines how much the dimensions of the material may change as a function of temperature. Thermal expansion coefficient may be anisotropic property of a composite. The composite may have different properties to a melt flow direction and to a direction perpendicular to the melt flow direction, so called cross direction. The fibers may be oriented to a melt flow direction, at least on surface zones of the composite. Thermal expansion coefficient may be larger in the cross direction compared to the melt flow direction. Thermal expansion coefficient to the melt flow direction may be at least 10%, or at least 20%, or at least 30%) smaller than the thermal expansion coefficient to the cross direction. Thermal expansion coefficient may depend on matrix material of a composite. Thermal expansion coefficient to the melt flow direction may be 1-50%, or 1-40%, or 1-30%, or 1-20%, or 1-10% smaller than the thermal expansion coefficient to the cross direction. In an embodiment the thermal expansion coefficient to the melt flow direction corresponds to the thermal expansion coefficient to the cross direction. In an example, the thermal expansion coefficient in the melt flow and cross direction are the same.

The presented relations of thermal expansion coefficients are percentage values, not weight percentages. Thermal expansion coefficients of a composite are in melt flow direction, if nothing else is explicitly stated.

In general the thermal expansion of wood may be smaller than the thermal expansion of metal. For example, the thermal expansion coefficient may be for a wood $3\text{-}6 \cdot 10^{-6}/°$ C. depending on wood material; for aluminium $23 \cdot 10^{-6}/°$ C., for silver $19 \cdot 10^{-6}/°$ C., for iron $12 \cdot 10^{-6}/°$ C. In general the thermal expansion of plastic may be larger than the thermal expansion of metal. For example, the thermal expansion coefficient may be for polystyrene $70 \cdot 10^{-6}/°$ C., for polypropylene $100\text{-}200 \cdot 10^{-6}/°$ C., for polyethylene $200 \cdot 10^{-6}/°$ C., for polyester $124 \cdot 10^{-6}/°$ C., for polyamide $110 \cdot 10^{-6}/°$ C., for ABS $74 \cdot 10^{-6}/°$ C., for polycarbonate $70 \cdot 10^{-6}/°$ C. By selecting the ratio of matrix material and organic natural fiber material of a composite, the composite may designed with a specific thermal expansion coefficient.

A thermal expansion coefficient of a composite comprising matrix material and organic natural fiber material may be smaller than a thermal expansion coefficient of a composite comprising the matrix material without organic natural fiber material. A composite comprising matrix material and organic natural fiber material may comprise thermal expansion coefficient less than 20%, or less than 40%, or less than 60% smaller than the thermal expansion coefficient of a composite comprising the matrix material without organic natural fiber material. The thermal expansion coefficient of a composite comprising matrix material and organic natural fiber material may comprise 40-80%, or 50-80%, or 60-80% of the thermal expansion coefficient of the matrix material without organic natural fiber material. The thermal expansion coefficient of a composite comprising polypropylene matrix material and organic natural fiber material may comprise 40-80%, or 50-80%, or 60-80% of the thermal expansion coefficient of a polypropylene matrix material without organic natural fiber material.

Generally composite comprising matrix material and organic natural fiber material has lower thermal expansion coefficient compared to the matrix material. According to an example thermal expiation coefficient for a plastic matrix is $100\text{-}200 \cdot 10^{-6}/°$ C., whereas the plastic matrix comprising 40 wt-% of organic natural fiber material may comprise thermal expansion coefficient of $90\text{-}120 \cdot 10^{-6}/°$ C., and the plastic matrix comprising 50 wt-% of organic natural fiber material comprises thermal expansion coefficient of $60\text{-}90 \cdot 10^{-6}/°$ C.

In an example, linear thermal expansion coefficient is measured according to ISO 11359-1/2 (ppm/K) in longitudinal and transverse direction. A composite comprising polypropylene matrix and 40 wt-% of organic natural fiber material comprises cross direction linear thermal expansion coefficient of 118 ppm/K, and flow (longitudinal) direction linear thermal expansion coefficient of 51 ppm/K. A composite comprising polypropylene matrix and 50 wt-% of organic natural fiber material comprises cross direction linear thermal expansion coefficient of 79 ppm/K, and flow direction linear thermal expansion coefficient of 76 ppm/K. For the latter composite the values show almost symmetric properties of thermal expansion. This may be desired for certain applications.

The thermal expansion coefficient may be selected to have a value equal to, or close to, or compatible with another material. Such material could be, for example, a metal or another composite. Advantageously, this may be used to match the thermal expansion coefficients of different materials in a product. This may have effect on acoustic properties for the product. The matrix material and the organic natural fiber material components for the composition may be selected to obtain a desired density and thermal expansion for the composite material. Also composite production parameters have effect on thermal expansion properties of the composite, which is direction dependent. Orientation of organic natural fibers may have effect on anisotropic variables. For example, heat expansion in a composite structure comprising 40 wt-% of organic natural fiber material may have a larger thermal expansion than a composite structure comprising 50 wt-% of organic natural fiber material. Therefore, the dimensional stability of a composite structure comprising 50 wt-% of organic natural fiber material may be improved compared to a composite structure comprising less organic natural fiber material. Similar selection of the composition may further be used to control anisotropic speed of sound in the composite, which is discussed in more detail later in this application.

For example, composite may be attached or fixed to a metal in a product. Metal parts have certain known thermal expansion coefficient, which indicates how metal parts react to changes of external temperature. It is advantageous to match the thermal expansion properties of product parts being in connect or attached to a metal parts with the thermal expansion of the metal in question. Similar properties of thermal expansion may enable to maintain connection, attachment, properties and/or quality of the product even at alternating temperatures. For example, car door made of metal has certain thermal expansion coefficient and may exposured to external temperatures varying a lot, e.g. from −50° C. to +50° C. Inside lining of the car door may comprise a composite according to embodiments. Although the car door has insulation between external and internal parts, metal door conducts heat. The external temperature and convective heat have effect on connecting internal parts and/or parts continuing inside. It is advantageous to choose a composition, matrix material, organic natural fiber material, possible additive material, manufacturing parameters and/or fiber orientation so that the thermal expansion coefficient of the composite to be attached to or to be placed next to a part of another component corresponds to that of the metal part.

In an example, a guitar may be made at least partly of a composite comprising matrix material and organic natural fiber material. Strings of the guitar may comprise steel or nylon. Vibration of string(s) produces sound. The sound is amplified by leading the vibration to the guitar body via a bridge of the guitar. Large body part of the guitar amplifies the sound. Guitar body may comprise a composite comprising matrix material and organic natural fiber material, where thermal expansion coefficient of the composite may be brought closer to the thermal expansion coefficient of metal strings. A composite comprising organic natural fiber material may comprise more stable properties, when exposure to thermal changes, than for example traditional instrument material, like wood. Minimized dimensional change in function of temperature may have effect of maintaining playability and/or avoiding tuning in altering external conditions. Thermal behavior of guitar body of composite according to embodiments may reduce need of tone tuning of the guitar and/or increase life cycle of the strings. In addition to change of temperature, the composite has resistance to other external changes, like humidity. Resistance to external changes, or maintaining properties in varying external conditions, is advantageous for musical instruments. The above example applies mutatis mutandis to other string instruments.

Manufacturing

In variety of industrial applications it is desirable that an acoustic material conforms a shape of a surface or retains a particular shape. Heat molding provides ease and speed to production for a shaped acoustic materials. Shape of a material may have effect on sound absorption and stiffness of a material.

According to at least some embodiments the matrix material comprises thermoplastic polymer based matrix material and/or thermoplastic oligomer based matrix material. The polymer based matrix material contains one or more polymers, and the oligomer based matrix material contains one or more oligomers. The total amount of the polymers and/or oligomers calculated from the total amount of the matrix material is preferably at least 80 wt-%, at least 85 wt-%, at least 90 wt-%, at least 95 wt-% or at least 98 wt-%. Minor amounts of thermosetting resins or other residues, such as polyurethane, may be present in the polymer compositions without sacrificing the thermoplastic properties. A thermoplastic polymer is generally a long chain polymer that may be either amorphous or semicrystalline in structure.

Figure 4:
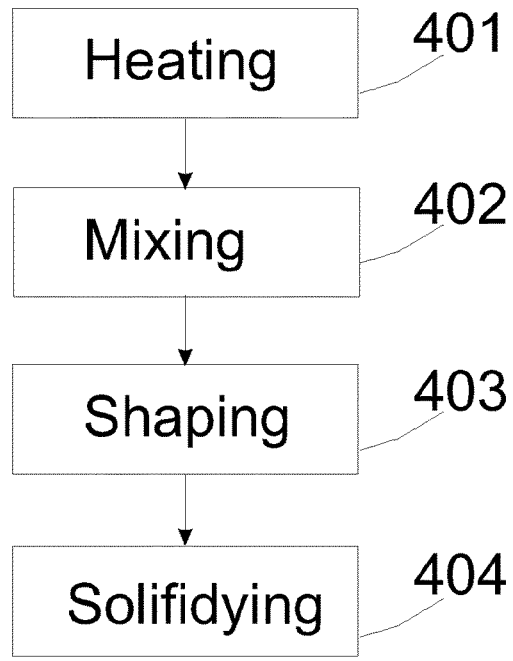
FIG. 4 illustrates a manufacturing method according to an embodiment of the invention.

FIG. 4 illustrates a manufacturing method according to an embodiment of the invention. The matrix material is heated 401. When thermoplastic composites are produced, the matrix material, for example a polymer, is heated in order to achieve a melt form of the polymer. Thermoplastic polymers are often solid at the low temperature and they form viscose polymer melt at the elevated temperatures. Typically the viscosity of these polymers decreases when temperature is increased, and the polymers flow and wet the surfaces more easily.

The matrix material is, at least partly, in melt form, when
  the organic natural material can adhere to the matrix material, and/or
  the melt flow index of the material can be measured (according to standard ISO 1133 (valid in 2011)), and/or
  the organic natural fiber material can adhere to the surfaces of matrix material particles.

Advantageously, melt flow rate, MFR, of the matrix material is under 1000 g/10 min (230° C., 2.16 kg defined by ISO 1133, valid 2011), more preferable 0.1-200 g/10 min, most preferable 0.3-150 g/10 min. Advantageously, melt flow rate, MFR, of the matrix material is over 0.1 g/10 min (230° C., 2.16 kg defined by ISO 1133, valid 2011), more preferable over 1 g/10 min, most preferable over 3 g/10 min.

In an example measurement, melt flow rate (ISO 1133) for a composite comprising polypropylene and 40 wt-% of organic natural fiber material was 8.1 g/10 min. In another example measurement, melt flow rate (ISO 1133) for a composite comprising polypropylene and 50 wt-% of organic natural fiber material was 3.4 g/10 min/190° C., 10 kg.

At least in some embodiments the melting point of the matrix material is under 250° C., preferably under 220° C., and more preferable under 190° C. Advantageously, the glass transition temperature of the matrix material is under 250° C., preferably under 210° C., and more preferable under 170° C.

Other components of the composite, like organic natural fiber material, are mixed with the polymer melt 402. Optionally additives, like coupling agent and/or lubricant, may be added to and mixed with the melt after or before the organic natural fiber material(s) have been added. Often it is convenient to mix the other components into polymer when the viscosity of the polymer is low, meaning that the temperature of the polymer melt is high.

The composition comprising polymer matrix and organic natural fiber material may have a temperature between 230° C.-140° C., advantageously between 220° C.-180° C., when coupling agent is added to the process. After mixing said components, covalent bonding between the coupling agent and the organic natural fiber material may initiate. In at least some embodiments the temperature of the mixture is maintained or decreased to the temperature of at least 180° C., preferably at least 185° C., or more preferably at least 145° C. in order to initiate and maintain the covalent bonding. In addition to covalent bonding, this manufacturing phase may have effect of reducing the amount of moisture from the mixture.

A mixture comprising polymer matrix, organic natural fiber material and a coupling agent may be heated until the mixture has reached a temperature of at least 180° C., preferably at least 185° C., to reduce the amount of moisture from the mixture and to achieve coupling between the coupling agent and the organic natural fiber material. In said temperatures said coupling takes the form of covalent bonding. The temperature of the mixture may advantageously be even higher, such as at least 200° C., where the reaction may take place even more rapidly and efficiently. If the process temperature is increased further, the organic natural fiber material may begin to lose its structure and decompose. Material temperatures less than 230° C. in the process are preferred. When the coupling agent, such as a maleic anhydride grafted polymer, is activated, it begins to react. To further reduce moisture an optional evaporator or dryer may be used.

Due to provided heat and/or pressure a polymer matrix and a coupling agent may be in a flowing form and coupling agents may form at least two types of chemical bonds: covalent bonds between polar fiber and non-polar polymer, or hydrogen bonds, such as those with water molecules. In order to achieve covalent bonding between polar fibers and non-polar polymers, sufficiently high temperatures, such as those described above, should be used. Selection of polymer matrix, organic natural fiber material, coupling agent and temperature may have effect on type of bonding between the organic natural fiber material and the coupling agent. The bonding energy level of hydrogen bonding is on the range of ca. 5 to 30 kJ/mol, while covalent bonding has a level of ca.

70 to 700 kJ/mol. Therefore, the stability of composite with covalent bonding between the organic natural fiber material and the coupling agent is higher than with hydrogen bonding. In other words, a covalent bonding, once occurred between the organic natural fiber material and the coupling agent, is stable and not easily interfered by impurities or competing molecules that may later occur in the production of composite comprising matrix material and organic natural fiber material. High temperature may have effect of reducing the moisture content in the mixture and/or evaporate the water molecules out of the melt, as hydrogen bonding is susceptible for moisture. Water molecules may break a hydrogen bond between a fiber and a coupling agent, which decreases the mechanical strength of the composite structure. This may also happen with surface water molecules, which may cause a disruption of the hydrogen bonds. The energy input during the melting and mixing should be high enough in order to be able to remove any moisture from the fiber surface.

A lubricant may be mixed 401 to a melt of a polymer composite comprising organic natural fiber material, and optionally a coupling agent. For example, maleic anhydride may be used as a coupling agent. A coupling between maleic anhydride and organic natural fiber material may be interfered by metal ions or other impurities, such as different pigments in the melt. The compatible lubricants in the manufacture of polymer composites comprising organic natural fiber material advantageously do not contain metal ions, which might cause unwanted reactions with the coupling agent. Examples of suitable lubricants are blends of complex, modified fatty acid esters and fatty acid amides. Lubricants may have effect of improving rheology of the melt by reducing the internal (molecule/molecule) and/or external (polymer/metal) interactions. For an extrusion with a high shear rate lubricants may have effect of avoiding defects on the extrudate surface and/or preventing melt fracture. Forming by extrusion with a lubricant may have effect of providing a simple and efficient manufacturing process and/or enabling a continuous tuning of the process parameters to alter the material flow.

Additionally or alternatively other additives and/or fillers may be added at the mixing phase 402 to the composite comprising matrix material and organic natural fiber material. According to an embodiment a lubricant is combined with a polymer matrix material. After that, organic natural fiber material is added to the mixture in a mixing phase 402. Addition of lubricant to the polymer matrix may have effect of enabling later added organic natural fiber material to bond better with the polymer matrix compared to a situation, where the organic natural fiber material is added to the polymer matrix simultaneously with the lubricant, which may then have effect of interfering the bonding between the organic natural fiber material and the polymer matrix. Adding and/or mixing lubricant to the polymer matrix before adding the organic natural fiber material to the polymer matrix may have effect on damping properties of the composite.

The melt composite mixture is shaped 403, for example with a mold or a die. The molten composite may be arranged to flow to a mold and to propagate to a melt flow direction. The composite mixture is arranged to fill the mold evenly due to low viscosity in melt form. Alternatively molten composite may originate from a shaped nozzle or die, accommodating the shape of it. The melt flow direction is from a nozzle or die towards the other end(s) of a cavity. Different kind of techniques, like extrusion or injection molding, may be utilized. The molded or extruded composite is arranged to solidify 404, for example due to decrease of temperature. Temperature of the mold may be for example 60-80° C. Different mold temperatures, like 30-50° C., may be utilized for example for PLA, or depending on other factors and objectives, like period or surface quality.

During manufacturing organic natural fibers of a composite are arranged to orient along a melt flow direction. Tubular organic natural fibers may have orientation along the melt flow direction. The fibers may orient lengthwise along a surface of the formed composite. At least at surface zones of a composite the organic natural fibers are oriented along the melt flow direction. Preferably at least 70 wt-%, or more preferably at least 80 wt-%, or most preferably at least 90 wt-% of the tubular organic natural fibers have orientation along the melt flow direction. According to an embodiment less than 20 wt-%, or preferably less than 15 wt-%, or more preferably less than 10 wt-% of the organic natural fibers deviate from the melt flow direction less than 45°, or preferably less than 40°, or more preferably less than 35°, or most preferably less than 30°. Fiber orientation may occur at least on surface zone(s) of a composite. Surface zone(s) may comprise 10-45% of the thickness of the composite. At least for thick composite parts, for example order of 10-20 millimeters or 3-5 mm thick, orientation of organic natural fibers may occur well only on surface zone(s) of the composite. Organic natural fiber orientation may be controlled in order to achieve desired acoustic properties. Especially direction dependent, anisotropic properties may be achieved by controlling organic natural fiber orientation of a composite. For example extrusion or injection speed has effect on orientation of the organic natural fiber components and/or temperature and cooling rate of the composite. Organic natural fiber orientation may have effect on mechanical properties of a composite. For example stiffness is higher in the direction of orientation (melt flow) than in the direction perpendicular to it. Organic natural fiber orientation may have effect on speed of sound in the composite, damping of sound radiation, sound transmission properties, thermal expansion properties, shrinking of a composite, an acoustic quality factor, a modulus and/or a sound wave resistance.

A suitable thermoplastic polymer retains sufficient thermoplastic properties to allow melt blending with organic natural fiber material and possible additives, and permits effective formation of the formed composite into shaped articles by the used production method. The production can be done by a number of methods, extrusion, injection molding, compression molding, thermoforming, foaming or the like being example techniques.

In extrusion process a composite is melt and pushed through a die. Cross-section(s) of the die may be selected according to application and also complex cross-sections are possible. In injection molding material is injected to a mold. Typically heated material is mixed and injected with aid of high pressure to a mold cavity, where it cools and hardens/solidifies conforming form of the mold. Versatility of injection molding is facilitated by considerations of used material, shape and properties of a part, for example. In compression molding material is placed in an open, heated mold cavity. The mold is closed and pressure is applied to force the mold material into contact with all mold areas. Heat and pressure are maintained until the molding material has solidified. Compression molding is typically a high-volume, high-pressure method suitable for molding complex, high-strength material reinforcement. Compression molding is preferred in large scale part manufacturing. Injection molding is utilized for bigger production volumes.

A composite or a component may suffer from unwanted dimensional changes during manufacturing. During injection molding a composite or a component may shrink. Shrinkage during injection molding may affect accuracy of the size of the molded composite or component. The molded composite or component may comprise sink marks, especially on thick walls, due to dimensional inaccuracy. A composite comprising organic natural fiber material undergoes less shrinkage compared to a semi-crystal matrix material. A composite comprising organic natural fiber material undergoes less shrinkage than a matrix comprising a corresponding weight-percentage of glass fiber and/or mineral additives. The volume-percentage of the organic natural fiber material is larger than that of glass- or mineral additives with the corresponding weight-percentage. A composite comprising organic natural fiber material may have effect of providing better dimensional accuracy during injection molding compared to a matrix comprising a corresponding weight-percentage of glass fiber and/or mineral additives. A composite comprising organic natural fiber material may have effect of enabling formation of thick walls by injection molding without remarkable sink marks.

Foaming, or foam injection molding, comprises injection molding combined with foaming technology. Foaming agents are added to a heated and molten composite comprising matrix material, organic natural fiber material and possible additives. A single phase of the molten composite is injected into the mold cavity. Size of a foaming agent may change during foaming injection process. For example gas bubbles may enlarge, be combined and so on. Foaming is arranged to occur at least mostly in a mold after the molten composite is injected to the mold 403, before solidifying of the composite. A composite with porous structure may be manufactured by foaming. Porous structure may comprise air bubbles, gas bubbles, hollow glass balls, air filled plastic capsules, or other suitable components.

Figure 5A:
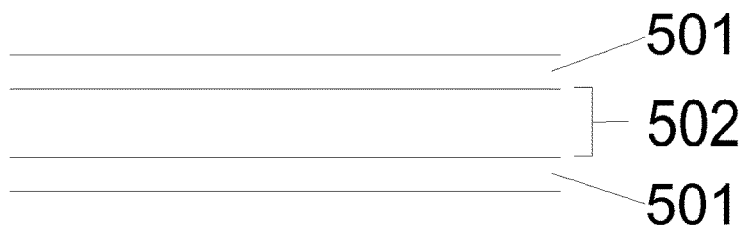
FIG. 5a illustrates a composite according to an embodiment of the invention before foaming.
Figure 5B:
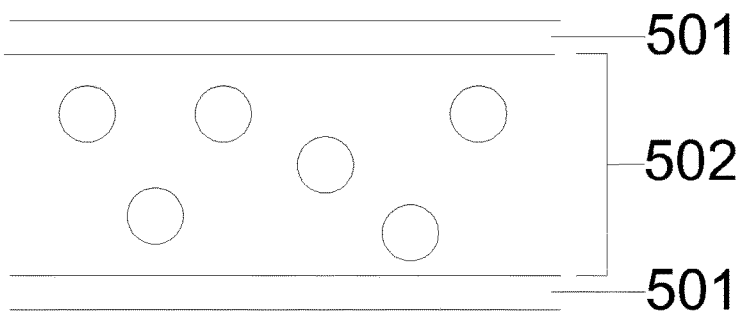
FIG. 5b illustrates a composite according to an embodiment of the invention after foaming.

FIG. 5ab illustrate a composite according to an embodiment before (5a) and after (5b) foaming. In FIG. 5a for example a polypropylene matrix comprising organic natural fiber material, optionally additives and/or fillers, and 0.5-3 wt-% of chemical foaming agent is injected to a mold. Temperature of a pressing cylinder may be 200-230° C. Advantageously internal temperature in a mold cavity is kept below 100° C., for example 90° C. When getting in contact with internal walls of the mold cavity, the composite starts to solidify on its surfaces 501 next to the mold walls. The central zone of the composite 502 remains in a melt state in FIG. 5a. After and/or during the composite is injected to the mold cavity, the foaming is enabled. Some or minor parts of the foaming agent may be activated before injection to the mold. Activation of foaming agents may be controlled after the composite is injected to the mold. Foaming agent is arranged to decompose in a mold. For example, cavity may be heated or pressure in the cavity may be decreased. Foaming agent is arranged to expand, as is illustrated in FIG. 5b. For example pressurized gas, acting as a foaming agent, expands due to decreased pressure. Gas expands in the composite material surrounding it. Foaming occurs inside, closer to center zone of the composite 502, not on the solidified surface zones 501, as is shown in FIG. 5b. It may be advantageous to have solid surface layers before foaming occurs in order to have uniform surface structure. Foaming at the surfaces or close to the surfaces of the composite may not be desired. When surface zone(s) comprise minimum, if any, porosity, the surface of a composite or a product comprises higher density compared to foamed internal zone(s) of the composite or the product. Tight surface may have effect of providing better permeability and/or protecting internal zone(s) below the surface. Dense surface is stiff and rigid, providing rigidity to the structure.

Foaming may provide structural foam. The foam comprises cells containing pore structure and surrounding medium, for example polymer. The cells may be macro- or microscopically open, partially or totally closed. Foaming comprises forming trapped cells or pockets of pores in a liquid and/or solid. In a closed-cell structured foam cells are not interconnected. Instead, the cells form discrete pockets, each completely surrounded by surrounding medium (as in FIG. 4b). In an open-cell structured cells are connect with each other. Cells form an interconnected network, where cells are dispersed in surrounding medium. Liquid region of a medium may contain cells of many different sizes. When a melt is drained, for example polymer matrix regions may become thinner or smaller. The closed-cell structured foams typically have higher compressive strength than the open-cell structured foams. The higher compressive strength is at least partly due to the closed-cell structure. Closed-cell structured foam materials are generally denser and/or include bigger amount of material than open-cell structured foam materials. The closed-cell structure comprises dimensional stability, low moisture absorption coefficient and enhanced strength properties. Insulation properties of open-cell structured foam depends on surrounding medium. A specialized gas may be used in closed-cell structured foam in order to provide good insulation.

A closed-cell foam, where pore particles are embedded in a matrix material, may be called as syntactic foam. Syntactic foam may have effect of providing very high strength-to-weight ratio. Syntactic foam may employ shape memory as its matrix. It has characteristics of shape memory resins and composite material. For example, ability to be reshaped repeatedly, when heated. Shape memory foams may provide advantageous effect for applications needing dynamic structural support, flexible foam core and/or expandable foam fill.

In foaming an inert gas may be injected into a polymer melt or released due to a chemical reaction in a melt. Foaming agents are employed to produce a cellular structure foam in the foam injection molding process. Foaming agent may comprise a chemical foaming agent or a physical foaming agent. Chemical foaming agent is released after a chemical reaction in a melt. Chemical foaming agents comprise compounds that decompose by heating, releasing a high gas volume. Chemical foaming agent may comprise organic or inorganic compounds, which may be exothermic (releasing energy) or endothermic (consuming energy). Examples of chemical foaming agents are hydrazines, sodium-bicarbonate and citric acid. Chemical foaming agents break down to form gases, such as nitrogen gas ($N_2$), carbon dioxide ($CO_2$) and/or water ($H_2O$). Using endothermic chemical foaming agents may have effect of good surface aspect, uniform cell structures and/or high density. Physical foaming agent is injected into a melt. Physical foaming agents comprise highly-pressurized gasses, for example nitrogen ($N_2$) or carbon dioxide ($CO_2$), that expand when returning to atmospheric pressure. Other type of physical foaming agents are volatile liquids that expand by heating in order to produce a high volume of vapour. Liquid physical foaming agents may comprise Butane, n-pentane or water, for example. For thin parts physical foaming may be preferred over chemical foaming.

Manufacturing by foaming injection mold process may provide positive effects to foamed products. The effects may comprise absence of sink marks on a surface, negligible warpage, geometric accuracy, high rigidity-to-weight ratio, weight reduction, low hold pressure, fast cycle time and/or part cost reduction. Foamed composite comprises porous structure. Effects on acoustic properties may comprise improved sound absorption, improved sound transmission loss and/or improved vibration damping.

According to an example embodiment polypropylene (PP) or polylactide (PLA) composite formed by foaming using 2 wt-% of exothermic chemical foaming agent. In another example embodiment polylactide (PLA) composite formed by foaming using 2 wt-% of exothermic chemical foaming agent. The foamed product density is reduced, when compared to the non-foamed counterpart, at least 5%, or preferably at least 20%, or more preferably at least 30%. The foamed product density is reduced, when compared to the non-foamed counterpart, 5-60%, or preferably 20-50%, or more preferably at least 30-40%. Density of a non-foamed material may be known or measured, and it may be compared to a density measured from an injection foamed sample of the material.

The manufacturing method may be used to provide a composite comprising matrix material and organic natural fiber material in a form of a granulate. The measurements and tests, which are employed in order to measure quantities and values for the composite, are made with an injection molded sample, unless a standardized method otherwise describes.

Foamed Composite

According to at least some embodiments mechanical properties of foamed composites are influenced compared to their non-foamed counterparts.

A composite comprising natural organic fiber material comprises porosity, or a pore volume, which may be related to the experimental density of the composite material. Pore volume may be determined indirectly via density. Density may be determined using methods specified in EN ISO 1183-1, ISO 1183-2, ISO 1183-3 (2004), and their counterparts in other standards organizations, laboratory and on-line density sensors and float-sink tests with different liquids of given density, and by compressing a sample of a composite material at an elevated temperature and by applying vacuum at the same time, and thereafter by measuring the density of the formed pressed and cooled sample material by the previously mentioned methods, or any other suitable methods. Pore volume may be determined directly by methods employed for porosity measurements, such as computed tomography methods, water saturation and water evaporation methods, and thermoporosimetry. Pore volume may be determined directly, indirectly and by their combinations. Pore volume of a composite according to embodiments is preferably less than 15%. In an embodiment, pore volume of a composite comprising organic natural fiber material according to embodiments is 6-50%; preferably 8-30%, more preferably 9-20 wt-%.

Foaming may be preferred when the balance of sound wave resistance and damping of sound radiation needs to adjusted. Foaming may be used to reduce composite density, which may have effect on acoustic properties. Foaming may be employed in order to change the balance between sound transmission and absorption, which is often desired in loudspeakers. Higher porosity may lead to higher absorption, which may have effect of reducing the intensity of standing waves and echoes. Low tensile strength may not be so critical for loudspeakers, if bending stiffness of a cell of a loudspeaker remains unchanged. Because the flexural stiffness is proportional the thickness power 3, so low tensile modulus, which may be obtained by foaming, may lead to a similar flexural stiffness. A foamed sample, which has the same weight than the non-foamed sample, is thicker and the foamed sample material may have even higher flexural stiffness compared to the non-foamed sample.

In an embodiment density of a composite comprising organic natural fiber material was controlled by foaming. Three different chemical foaming agents were used. The table 2 shows examples, wherein the same material has been foamed with two endothermic chemical foaming agents and one exothermic foaming agent. As the table 2 shows, density and the tensile modulus decrease with higher foaming agent content.

TABLE 2

Density and tensile modules of a composite 1 and samples foamed with different foaming agents.

| Sample | Density (g/cm3) | Tensile modulus (MPa) |
|---|---|---|
| Composite 1 | 0.99 | 2300 |
| Composite 1 + endothermic foaming agent A 1% | 0.91 | 2080 |
| Composite 1 + endothermic foaming agent A 2% | 0.87 | 2050 |
| Composite 1 + endothermic foaming agent B 1% | 0.92 | 2100 |
| Composite 1 + endothermic foaming agent B 2% | 0.88 | 2010 |
| Composite 1 + exothermic foaming agent 1% | 0.89 | 2060 |
| Composite 1 + exothermic foaming agent 2% | 0.81 | 1910 |

Density of a non-foamed sample may be measured from the injection molded sample, where the after pressure of the injection molded machine has been as high as possible or at least 800 bars and after pressure time has been at least 15 second. The after pressure time has been long enough, if the weight of a sample does not increase with longer after pressure time. This measurement can be done also for ready-made product by grinding the material and by injection molding the grinded material.

In one embodiment the density of the foamed composite comprising organic natural fiber material is 2-50% lower, preferably 4-30% lower, or most preferably 4-20% lower than the density of the non-foamed composite comprising organic natural fiber material.

Although tensile modulus of a foamed composite may decrease, flexural stiffness (of a wall) increases. Flexural stiffness is increased in the order of thickness in power of three. This has effect on providing stiff material with less density and with same amount of material. This may enable providing certain desired characteristics with less amount of material. Porosity of the foamed composite may provide good acoustic insulation material. An incident sound absorption coefficient of a foamed part is higher compared to a non-foamed or non-porous part. Sound waves are absorbed to a porous material. According to at least some embodiments, hollow structures of natural fiber composites have higher sound absorption coefficient than their synthetic fiber or glass fiber counterparts. This may be due to stiffness of a glass fiber and/or length of synthetic or glass fibers, which may lead to better sound transmission. A hollow, possibly platy or flattened fiber structure may have reduced sound transmission properties. The foaming and organic natural fiber material may have effect on sound damping properties. A foamed composite comprising organic natural fiber material and porosity according to an embodiment is advantageous for structures, where sound damping is desired, especially, with light-weight. The foamed composite may provide good damping of low frequency sounds, for example frequencies above 1 kHz. No separate air gap is required, so dimensions of the composite element may be compact. Organic natural fiber components are recyclable and easy to handle, whereas for example glass fiber requires separate waste-handling and form sharp pieces, when crushed. The structure according to embodiments may replace or establish a sound damping structure of felt, foam, laminate and/or honeycomb, for example. Such structures may be used for example in automotive door panels or other automotive interior parts.

Foamed, porous product comprising matrix material and organic natural fiber material comprises good damping properties. Sound waves are absorbed to a porous material. Foamed product comprising matrix material and organic natural fiber material may be utilized in any application where attenuation of sound is desired. Acoustic panels may be used inside or outside. A panel comprising porous composite is usable in exterior circumstances due to its weather resistance. Especially composite may persist changes in moisture and temperature. Insulation panel may have desired properties of sound absorbing and/or low-weight and/or compact size. Also low frequencies, for example above 1.5 kHz, may be absorbed effectively. Bigger elements, as panels, may be formed of the composite by foaming. Also smaller elements, or just parts of products may be formed according to embodiments.

A Panel for a Car

A composite comprising organic natural fiber material may be used as a car door panel. The composite material according to embodiments for a car door panel may be manufactured by foaming. Foamed composite may provide desired light-weight and stiff composite for a car door panel. Foamed composite may employ less material, and thus provide more ecological solution than the non-foamed counterpart. Density of the foamed composite may be lower than density of a non-foamed composite, and this may be advantageous for a sound damping properties. External noise inside the car may be reduced with the composite panel. The composite for a car may act as thermal shielding panel to reduce or prevent transmission of heat from various thermal sources in the car and/or to the car from external sources. The composite panel may be used in other parts of the car interior and/or exterior. Lightweight, stiff, noise attenuating properties of the composite panel may replace for example plastic, metal and/or wooden parts of a car. The composite panel may be designed to comply with other materials properties, like thermal expansion coefficient, so that it is attachable to the material(s) next to it and/or comprises behavior according to or compensating the behavior of the other material(s). The ratio of matrix material and organic natural fiber material of a composite may have effect on a specific thermal expansion coefficient of the composite. Advantageously, the thermal expansion coefficients of different materials placed next to each other in a product may be arranged to match in order to obtain desired acoustic properties for the product. Composite panel may be stable and resistant to external circumstances. It may be used in external parts of the car. The composite element of an embodiment is tightly fixable to an exterior body of the car.

According to an embodiment a loudspeaker element is attachable to a composite element, for example a composite panel. The loudspeaker may be fixed to a composite element for a car. In addition to acoustic properties, the composite element for a car is durable, resistant to external circumstances and it holds up its dimensions. The loudspeaker may be steadily fixed to the composite element according to embodiments. Surface area of the composite element according to embodiments may be large compared to area of the loudspeaker element on the composite panel surface. For example, loudspeaker may reserve less than 10% of the panel surface area. The composite element for a car may hold a loudspeaker, while body of the car, for example exterior metal body forming a car door, to which the composite element is attached, is arranged to act as part of the enclosure.

Integral Parts

A composite comprising matrix material and organic natural fiber material enables manufacturing by injection molding. This may include or exclude foaming, as presented in previous. Selected composite contents, like matrix material and organic natural fiber material, and manufacturing methods enable formation of even and uniform element. Organic natural fiber material and possible fillers and/or foam agents are arranged to disperse uniformly in the composite. This has effect of providing acoustically uniform part. For example variations inherent to wooden parts may be avoided, and/or no compensation due to variation of material quality is needed, when utilizing the composite material. Injection molding enables continuous orientation of the organic natural fiber material over the formed surface. The fiber orientation has effect on acoustic properties. The properties are different along the melt flow direction and cross direction, which is perpendicular to the melt flow direction. Thus the formed part is anisotropic. Injection molding enables forming desired shapes without joints. For example, a desired dimensions and surface shape may be produced by making/using a suitable mold. Different shapes, volumes and thicknesses are advantageous for different types of applications. The composite formed by injection molding is suitable for variety of applications. For example, it is possible to provide a curved or curvilinear shape, or hollow tube as an integral part.

An integral part may be formed with injection molding. Joint lines or seams may be avoided. This may provide mechanically strong and viable parts. Integral part may have effect on sound wave transmission properties of a part. The organic natural fiber components are oriented according to melt flow direction. Fiber orientation may have effect on sound propagation to different directions. The parts may be designed so that desired effects in relation to fiber orientation are achieved. Produced composite product or part may be air-tight. This is important for example for closed elements. The composite parts according to embodiments maintain their dimensions. The parts are resistant to external conditions, like air humidity or changes in temperature. The composite is durable and usable in different environments, inside, outside, underwater, or where other special requirements apply.

In an example, a loudspeaker casing may be formed of the composite comprising matrix material and organic natural fiber material. Loudspeaker casing may comprise one or more parts. In prior solution, several MDF or plywood plates have been processed and treated to obtain desired dimensions and form, possibly perforated, joint to each other to form the casing, which outlines have been finalized, like grinded, rounded or polished. Instead of several manufacturing phases, the casing made of the composite may be injection molded of an integral part comprising stable acoustic properties. Corners may be avoided, at least at inner or outer parts of the product, where desired. Corners may pose acoustically weak points of a product. Instead of discontinuous corners, the product made of the composite may comprise continuous structure bending over the corner. This continuous structure comprises stable acoustic properties, which are not compromised due to corner structure and/or discontinuous structure and/or joining elements and/or attachment means. The part made of the composite may have effect on easy manufacturing and/or providing desired acoustic properties. According to an embodiment, a loudspeaker casing is made of less than 6, or less than 5, preferably less than 4 or less than 3, or more preferably of 2 parts. An integral composite part may be manufactured in a single phase and replace 2 or more traditional parts of a loudspeaker casing. A discontinuing point and/or a joint section in a corner may be avoided. An unwanted resonance due to separate parts may be avoided. The composite structure may integrally continue along two surfaces.

An integral structure may comprise no discontinuity in organic natural fiber orientation. A curved or curvilinear surface may be formed of one single piece and/or with one manufacturing phase. A cross sectional surface of an integral part may be a continuous part, wherein optionally no adjacent surfaces are placed orthogonal to each other. An integral part may be comprised of a continuous melt flow.

Different product parts may be replaced by a composite comprising matrix material and organic natural fiber material. Product parts, which in prior solutions are originally made of different materials, may be formed of the composite as an integral part. This has effect on interaction of two components. Further, some weak points, like seams or joints, may be avoided. Joining point may reduce sustainability of a product and/or resistance against external circumstances and/or acoustic properties. None of these form an issue, when integral part without a joint may be formed. An integral part forms a stable structure, whereas different parts and their attachment may have effect on each other and behave differently in different circumstances.

Interfaces between materials in general have an effect on a sound in solid materials. Materials may have different density or viscosity, which may attenuate sound. Changes in viscosity or density may change the rate at which a sound may be attenuated. When sound is moving through a material that does not have constant physical properties, it may be refracted. Refraction may be either dispersing or focusing. An effect of the composite according to embodiments is providing integral structures, where acoustic properties may be adjusted. A composite according to embodiments may provide a homogeneous element comprising uniform and continuous acoustic properties.

A loudspeaker according to embodiments may comprise any sound reproduction means comprising a loudspeaker element. A loudspeaker comprising the composite according to embodiments may be used outdoors. Use of a loudspeaker may occur in an unlimited space, externally. The space may comprise a stadium, a park, or any public or private external place. A loudspeaker according to embodiments may be used at a space comprising at least 1000 m³. A loudspeaker according to embodiments may be used at a space comprising 100-500 m³, or 10-100 m³, or 2-10 m³. The space may comprise for example a concert hall, a buss, an airplane, a cinema, a TV production scene, a HiFi studio, or any other public or private space.

Layers

Figure 6:
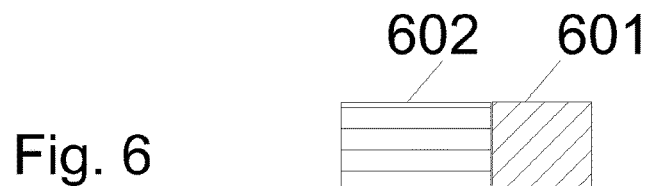
FIG. 6 illustrates a composite according to an embodiment of the invention.

FIG. 6 illustrates a composite according to an embodiment of the invention. The composite of FIG. 6 comprises layers 601 and 602. Layers are not in scale and their absolute dimensions, like thicknesses, as well as dimensions in relation to each other may vary according to embodiment, application, manufacturing method, use and/or environmental circumstances. A composite according to embodiments may comprise more than two layers. The structure comprising layers may be formed using same manufacturing techniques than for a single layer structure. A layer may be extruded on top of an existing layer. Alternatively two layers may be attached to each other. Layers 601, 602 may be laminated or glued on each other, for example. Layer 601 (602) may reinforce the structure. Layers 601, 602 may have similar properties in order to further enhance any desired properties, for example sound attenuation. Layer structure may be employed to provide different functional properties to an end product. Properties of two layer materials may be combined in order to enhance properties, like stiffness, or in order to achieve desired combination of properties. Layers may have different properties of sound reflection and/or absorption. Layered product may provide effect of transmitting sound to a desired direction and preventing sound propagation to other directions. For example earphone casing advantageously transmits sound towards one direction, to the user's ear, while the casing prevents sound leaking outside. Earphone casing also prevents external sounds from entering to user's ear.

According an embodiment, at least one of the layers comprises a composite comprising organic natural fiber material. The other layer may comprise other material. The other layer may comprise paint, coating, fabric, wood, wood based material or metal, for example. In an embodiment, the external layer comprises a composite comprising organic natural fiber material. The other layer, optionally forming inner structure, may comprise a softer layer, or less dense layer, or a layer comprising different acoustic properties. In another embodiment two external layers, on both sides of an internal layer, are made of a composite comprising organic natural fiber material. The layer of a composite comprising organic natural fiber material may have effect of providing a desired color and/or hard surface and/or fiber rich surface and/or stiffness for the structure and/or friction durability and/or shiny surface and/or dense surface and/or porosity and/or orientation of fibers.

Layered structure according to embodiments may provide tight casing. This may provide resistance to cold, air, water, dust, external noise and/or any other external influence. An external layer 601 may protect the internal layer 602 and/or product parts behind the layer(s). The external layer 601 may comprise different amount of natural organic fiber material than the internal layer 602. This may provide more stiffness for the external layer 601. Stiff, compact layer 601 may protect the internal layer against external circumstances. In an embodiment, amount of natural organic fiber material in the external layer 601 is less than amount of natural organic fiber material in the internal layer 602. This may have effect of providing desired appearance and/or exterior features to the external layer 601. According to an embodiment the external layer comprises none organic natural fiber material. According to another embodiment the external layer 601 comprises at least 10%, or at least 20%, or at least 30%, or at least 40%, or at least 50% less organic natural fiber material than the internal layer 602. In an example embodiment the internal layer comprises none organic natural fiber material. According to still another embodiment the internal layer 602 comprises at least 10%, or at least 20%, or at least 30%, or at least 40%, or at least 50% less organic natural fiber material than the external layer 601.

The external layer 601 may comprise natural organic fiber material oriented in a different direction than natural organic fiber material comprised in the internal layer 602. Fiber orientation may have effect on acoustic properties. Two layer structure may provide a sound transmitting panel on one side and isolating panel on the other side. For example layer 601 may be arranged to transmit sound waves, whereas layer 602 may be arranged to prohibit propagation of the sound waves.

In an embodiment layer structure is formed by surface layer(s) and an internal layer of a composite. The composite may be injection molded. During injection molding, depending for example on injection point placement, injection speed, temperature and/or materials, organic natural fiber components on the surface layer(s) are on average oriented along the surface of the composite. On the surface layer most of the organic natural fiber components are oriented such that longest dimension of a tubular components elongates along the surface and along the melt flow direction. The organic natural fiber components comprising cross sections are mostly oriented so that the larger of the cross section dimensions is arranged parallel with the component surface and the smaller of the cross section dimensions is arranged approximately perpendicular to the component surface. Towards the internal layers of the composite, the organic natural fiber components may be oriented so that longitudinal dimension of the tubular components is arranged along composite surface and their cross section dimensions are more randomly oriented. Tubular organic natural fiber components may rotate around their longitudinal dimension. In the internal layer, which may comprise 20-70% of the composite next to the surface layer or between the surface layers, the fiber orientation is more random and less fibers are oriented as in the surface layer(s).

The external layer 601 may comprise a non-foamed composite and the internal layer 602 may comprise a porous foamed composite. In other example, the external layer 601 may comprise a porous foamed composite and the internal layer 602 may comprise a non-foamed composite. One of the layers has properties of porous composite, while the other of the layers may provide for example compact surface shielding the porous layer. In an embodiment pore volume difference between the layers comprises over 10%, or preferably over 20%, or more preferably over 30%, or most preferably over 40%.

In an embodiment a layer 601, 602 comprises composite comprising organic natural fiber material and a layer 602, 601 comprises a wood, for example plywood, finewood or hardwood. The composite layer 601, 602 may be arranged to have thermal expansion coefficient close to that of the wood layer 602, 601. For example, the thermal expansion coefficient of the composite layer 601, 602 may be 2-100 times the thermal expansion coefficient of the wood layer 602, 601.

An external layer 601 may be arranged to comprise properties in accordance to desired surface finish. For example the external surface layer 601 may be arranged to be compatible with paint, film or coating. Layer(s) may comprise primer or other components enhancing attachment. The layer 601 may be arranged include an additive in order to provide better attachment to the other layer 602 and/or to other materials.

Layers 601, 602 may comprise similar polymer, for example polyolefin materials. Effect of using similar materials may be enabling attaching layers to each other by chemical or physical adhesion. Layers of compatible materials may be attached for example by compression (pressure) and heat during manufacturing phase. Separate adhesives, or adhesion production steps may be avoided. Also recycling is easy and straightforward for similar materials without extra layers. The integrated layer construction enables combining effects of two compatible layers without undesired seam layers. The composite for a layer may be selected and manufactured as presented in this application.

Density and the elastic modulus of a material may be used to describe characteristic impedance. Characteristic impedance refers to vibration energy that may be transmitted from one medium, e.g. layer 601, with a first impedance to another, e.g. layer 602, with a second impedance. For example, the impedance from a first material (601) may change when propagating into a second material (602). The behavior of sound propagation may be affected by some physical factors of the material, such as the relationship between density and pressure and/or the viscosity of the material.

In an embodiment a layer structure comprises at least two layers, wherein at least one of the at least two layers comprises a composite according to embodiments. Densities of the layer may differ. The layer comprising the composite according to embodiments may be more dense than the other layer. The layer comprising the composite may comprise density of at least 10%, preferably at least 20%, more preferably at least 30% bigger than the density of the other of the at least two layers. In an embodiment the layer comprising the composite comprises density of at least 70%, preferably at least 80%, more preferably at least 90% bigger than the density of the other of the at least two layers. According to an embodiment the composite comprises density of 10-90%, preferably 20-80%, more preferably 30-70% bigger than the density of the other of the at least two layers.

According to an embodiment the layer comprising the composite according to embodiments may be less dense than the other layer. In an embodiment a second layer, being the one of the at least two layers, comprises density of 300-900%, preferably 500-700% bigger than the density of the layer comprising the composite. According to an embodiment the one of the at least two layers comprises density of 30-400%, preferably 70-250%, more preferably 150-230% bigger than the density of the layer comprising the composite.

A layer structure comprising two integrated components may dampen vibration and noise due to non-homogenous structure. For example a porous composite behind an acoustic panel may provide desired acoustic sound absorption properties. Both materials in a layered structure may be arranged to dampen some or all of the same type of noise. As an example, one of the layer materials 501 may be arranged to dampen, or absorb, noise in frequency range of 600-2000 Hz, or preferably 800-1800 Hz, or more preferably 1000-1600 Hz. The other layer material 502 may be arranged to absorb noise in frequency range of 50-5000 Hz; or preferably 100-5000 Hz; or more preferably 1000-5000 Hz; or most preferably 2000-5000 Hz.

A composite according to embodiments provides effect of sound attenuating integrated with stabile and resistant structure and thermal properties. Further the composite may provide lightweight and low cost solution for many applications and end uses. Properties of a composite may be varied according to desired end use. While many different kind of constructions and/or uses are possible, similar manufacturing methods may be utilized for providing composites with different properties. Layer structure according to embodiments may be made by laminating two layers together, or by injection molding two materials at the same time, for example A Loudspeaker A loudspeaker may be part of a sound reproduction system, for example in a mobile phone, music player, computer, radio or other electric device. Public address (PA) loudspeakers are big devices designed for a professional sound reproduction. Moving area in PA loudspeaker is large compared to home equipment, because PA loudspeakers are used to move more air so that sound pressure is higher and the sound transmits further. Transfer ratio of PA loudspeaker is achieved in cost of sound quality. High Fidelity (HiFi) loudspeakers are optimized to provide stable reproduced sound of 20 Hz-20 kHz. HiFi loudspeaker may comprise one element broadband loudspeaker used for all frequencies. One element loudspeaker provides good quality to audibility frequency range and phase error is small, since all frequencies originate from the same element. However, better sound quality may be provided with more elements, separating high and low frequencies. Tweeter is used to reproduce high frequencies and bass loudspeaker for low frequencies. Bass loudspeaker comprises a closed casing, which is quite small in size, accurate in reproducing sounds and air-tight. A bass loudspeaker may comprise a bass reflex enclosure, where a tube is used to connect air space of the speaker to the external air. A suitable tube emphasizes certain frequency. Subwoofer may reproduce low frequencies, for example below 150 Hz. The reproducable frequency range is dependent on a cross-over frequency, where the audio begins to fall off towards 0 dB. Subwoofer casing shall be stiff and supporting, since pressure variations inside the casing are high. Also characteristic frequency of the casing may be avoided due to stiff casing in order to avoid undesirable resonance. Standing waves may pose a problem in loudspeakers and/or parts of it. Stiffness of the subwoofer casing may be enhanced by providing additional supporting panels or ribs to the casing. Subwoofer may comprise a reflex enclosure for reproducing desired frequencies via reflex tube or a passive element. Any of the casings, parts of casings, tubes, additional supports, ribs, sound transferring, controlling or guiding elements may be integral with the casing of composite comprising matrix material and organic natural fiber material.

A product can comprise a component comprising the composite described herein. A speaker cone body and/or a tube and/or a casing of a loudspeaker may be made of a composite comprising matrix material and organic natural fiber material. Matrix material of a speaker composite may be selected in view of overall flow, weight and stiffness. Amount and quality of organic natural fiber material and other optional fillers may be selected in view of stiffness to weight ratio and acoustic damping. According to an embodiment, amount of organic natural fiber material, which may be 30-70 wt-%, or preferably 40-60 wt-%, is selected such that desired acoustic properties are established. Modulus, stiffness and strength have effect on acoustic properties. In an embodiment, a loudspeaker comprises a composite comprising matrix material and organic natural fiber based material, wherein the matrix material comprises a thermoplastic polymer matrix, the organic natural fiber material comprises lignin in an amount of less than 15 wt-%, and the composite comprises a relative sound wave resistance of 1500-5000, wherein the composite is arranged to form a cone and/or a tube and/or a casing of a loudspeaker.

Manufacturing method may be used to adjust acoustic properties, like modulus, stiffness and strength. In some embodiments directional acoustic properties may be adjusted, or acoustic properties in different directions may be adjusted. In an example a composite comprises polypropylene as a matrix material and 45-65 wt-% of organic natural fiber material. In another example a composite comprises polylactic acid matrix and 30-50 wt-% of natural organic fiber material. Amount of organic natural fiber material may have effect on viscosity of the composite. Due to increased viscosity manufacturing phase is affected, or even unabled. Injection molding requires lower viscosity, compared to extrusion, which may allow higher viscosity composite to be used. Stiff and rigid polymer is advantageously used. Homopolymers may provide acoustic properties that prevail those of copolymers. Tensile modulus of a polymer matrix material used as a speaker material may be 1000-6000 MPa, preferably 2000-5500 MPa.

Sound Direction

Figure 7A:
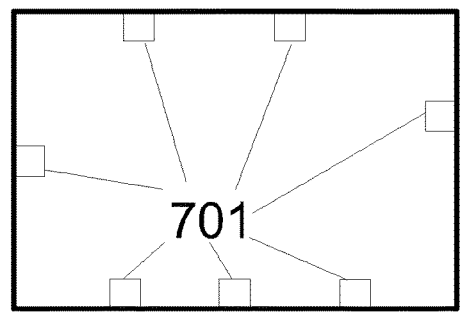
FIG. 7a illustrates a cross-sectional view of an example of sound direction parts in a composite according to embodiments of the invention.
Figure 7B:
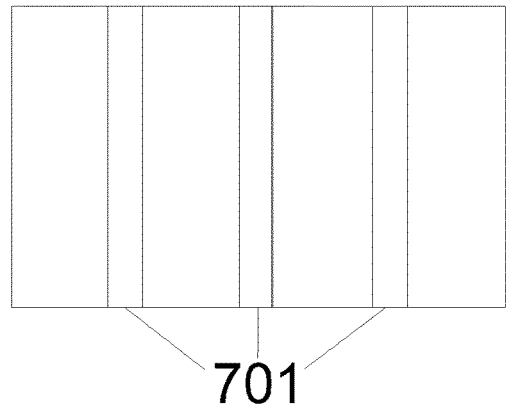
FIG. 7b illustrates a top view of an example of sound direction parts in a composite according to embodiments of the invention.

FIGS. 7a and 7b illustrate an example of sound direction parts 701, which are integral parts of a composite comprising matrix material and organic natural fiber material. FIG. 7a is a cross-sectional view from a side and FIG. 7b illustrates a top areal view as seen from above. The sound direction parts 701 are integral parts of the composite, which have been formed at the same time with the composite. The sound direction parts 701 may be realized in different shapes and sizes. Sound direction part may be any discontinuity of a solid part surface. For example a protrusion, unfill, channel, slot, groove, projection, or any other part that is suitable for directing sound waves. Parallel straight surfaces may cause generation of standing waves and unwanted echoes. These may be disturbing for example in a speaker box. Sound direction parts may have effect of minimizing or prohibiting standing waves and/or unwanted echoes. A flat and even reflection of sound waves is disturbed, and thus prevented by sound direction parts. FIG. 7ab show only an illustration of one possible cross section of the composite including sound direction parts on a surface. For example a speaker box may include sound direction parts 701 inside, in the internal surface of the speaker box. External dimensions of the sound box advantageously comprise straight surfaces and rounded edges in order to avoid reflections. The sound direction parts 701 provide reflecting surface to a sound waves so that standing waves may be avoided. A discontinuous surface may be formed by sound direction parts 701. A discontinuous surface may have effect of avoiding standing waves. A surface may be formulated so that it is arranged to deflect sound waves. Advantageously organic natural fiber material(s) of the composite are oriented in parallel direction with elongated sound direction parts. Alternatively, sound direction parts may extend to many directions. According to an embodiment at least two sound direction parts may cross each other. Injection molding may be advantageous when making a composite part comprising integral sound direction parts. Injection molding enables integral 3-dimensional structures to be designed and made effectively.

In the FIG. 7abc the sound direction parts have been illustrated as perpendicular to the wall of the loudspeaker. In an example, a sound direction part may be broader next to the wall than on its opposite end. It is possible that the angle between the wall and a sound direction part α is at least over 92°, preferably at least 95°, more preferably at least 100°. An angle α between a wall structure and a sound direction part structure may be 90-120°, or preferably 91-110°, or more preferably 92-100°. The angle α may have an effect on dimensions and/or area of the sound direction parts compared to total internal area of a loudspeaker casing. Further this may have effect of providing slanted reflections of sound waves.

Figure 7C:
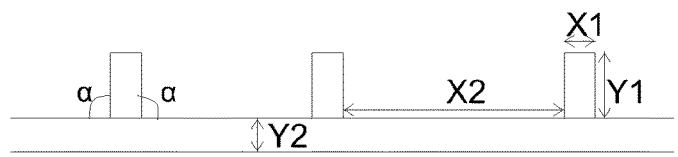
FIG. 7c illustrates a side view of a sound direction parts according to embodiments of the invention.

FIG. 7c illustrates a side view of sound direction parts. The sound direction parts may comprise height Y1 and width X1. Certain dimensions of sound direction parts are advantageous for avoiding or attenuating certain frequencies. For example frequencies of 330-400 Hz may be attenuated. For example in a loudspeaker casing comprising a wall thickness Y2, height Y1 of a sound direction part may be at least 0.5 times the wall thickness Y2 of the loudspeaker casing. Wall thickness of a loudspeaker casing may be 3-30 mm, preferably 5-20 mm. Height Y1 of a sound direction part may be 0.5-20.0, or preferably 1.0-10.0, or more preferably 1.5-7.0 times the wall thickness Y2 of the loudspeaker casing in the direction of the wall thickness. Width X1 of a sound direction part, which is parallel to the loudspeaker wall surface, may be 0.05-1.0, or preferably 0.1-0.5 times the height Y1 of the sound direction part. Sound direction parts reserve small amount of internal surface of the loudspeaker casing compared to the total internal surface area of the loudspeaker casing. The internal surface area of the loudspeaker casing, which is free of sound direction parts, may be 70-99%, or preferably 80-96%, or more preferably 85-95% of the total internal surface area of the loudspeaker casing. The sound direction parts may occupy 1-30%, preferably 4-20%, or more preferably 5-15% of the total internal surface area of the loudspeaker casing.

Sound direction parts may be formed on internal surface of a loudspeaker casing, for example. Integral sound direction parts may be integral with the loudspeaker wall. The sound direction parts and loudspeaker wall may be manufactured simultaneously and with the same manufacturing method. External surface of a formed structure comprising sound direction parts may be flat and even. Embodiments may have effect of providing a loudspeaker structure with integral sound direction parts and without sink marks.

For example polypropylene as a matrix material enables injection molding. Polypropylene comprises low stiffness to weight ratio due to low modulus of un-reinforced polypropylene. Stiffness may be improved by organic natural fiber material. As an example, lignin free organic natural fiber material provides effect of improved stiffness with small increase in weight and/or density. Stiffness may be improved by fillers, like talc, but in that case similar increase in stiffness entails much larger increase in weight and/or density compared to the material comprising organic natural fiber material. So using only fillers, like talc, with matrix, like polypropylene, would lead to unwanted weight increase.

Foaming may provide positive effect on a composite used in a speaker. Foamed composite material comprises porous cells. The porous structure may provide air propagation through the material, low density and/or an enlarged amount of scattering surface compared to non-foamed composite. Foaming may be used to enhance absorption. Foaming agent selection and amount of foaming agents in the composition have effect on acoustic properties of the composite part. When magnification is increased during foaming, modulus of the composite becomes lower. With increase of the foaming magnification the rigidity becomes higher.

Mechanical damping is desirable for cone body materials. Organic natural fiber material or its components provide stiffness to the composite. Volume fraction of organic natural fiber material have at least in part effect on overall damping, i.e. ability to dissipate mechanical energy. Organic natural fiber material may at least in part eliminate acoustic reflection and undesirable vibration. Organic natural fiber material may have effect of damping vibration induced by the sound waves conveniently fast, for example in composite or component of high modulus. Foaming agents, which are dispersed in the composite according to an embodiment, may provide effect of damping sound waves. Other fillers may be used to fine-tune the acoustic properties of the composite according to application and use. A composite may comprise matrix material and 30-50 wt-% of organic natural fiber material and 1-40 wt-% filler(s) and/or additive(s). The composite may have effect of providing high module and/or desired weight. Despite low-weight solutions, in some applications certain weight level may be desired and provide stability to the structure. For example in musical instruments is may be preferred to have certain weight for a casing and/or a part.

Musical Instruments

A composite according to embodiments may be used for musical instruments. In many instruments sound is produced by vibration of instruments' material. Matrix material may be a thermoplastic, for example a polystyrene. Alternatively regenerated polyolefin, cyclic olefin copolymer (COC), acryl or polyolefin may be employed. Amount of organic natural fiber material of the composite may be 20-60 wt-%. The used material has effect on acoustic properties, which are highly important in musical instruments. In addition other properties sensed by a user, like how the instruments look and feel, may have effect on material selection. Typically properties matching properties of the originally used wood materials may be preferred. Internal parts of instruments may be replaced with parts of a composite comprising organic natural fiber material according to embodiments. The internal parts of a composite comprising organic natural fiber material may be placed next to external wooden parts. A wooden part may comprise an integral extruded component comprising matrix material and organic natural fiber material. When vibration energy is transmitted from one medium with a first impedance to another medium with a second impedance, the first and second impedances need to be of same order. If there is a mismatch between the impedances, or difference between the impedances is remarkable, vibration energy does not proceed from a medium to another and no sound is transmitted. Impedance may be adjusted by adjusting material's density and speed of sound, or material's density and modulus.

In chordophone instruments a stretched string is oscillating in certain frequency and forming a sound. A string alone cannot transmit the oscillating energy to the external air due to its small cross-sectional area. Most string instruments are coupled to a sound box or -board for transmitting sound. For example, in a violin or a guitar, strings are coupled via a bridge to the top plate of the instrument, the soundboard. The bridge transmits vibrations of the sting to the soundboard. Soundboard also comprises a back plate, which contributes to radiating of sound. Shape and material of the soundboard have effect on sound quality and the way it is radiated to the surrounding air. Low impedance is beneficial for sound transmission into the air. A soundboard material comprises low impedance. Soundboard impedance is proportional to soundboard material's impedance and soundboard's thickness. For example thin strings have lower impedances than thicker soundboards. In order to achieve high quality sound, the impedances of the strings and the soundboard are controlled. Generally sound board comprises large surface area (compared to e.g. string) and lightweight. Soundboard is arranged to comprise density, such that it is able to oscillate optimally according to the oscillations of the string(s). High density of a soundboard material is proportional to radiation of loud sound. For example for violins, where soundboard thickness may be 2-3 mm, high density material providing rigidity to structure and enabling loud sound repetition is preferred. Advantageously a soundboard material does not lose energy via resistive losses, like internal friction, but comprises a flexible structure. Soundboard is designed to emphasize certain frequencies and attenuate certain other frequencies.

In some string instruments, like a violin, a bow may be used to excite string vibrations. A bow stick material and structure requires certain density, bending stiffness and damping properties. Preferably a bow comprises material of a very high density and a high modulus. Bending stiffness is dependent on geometry and modulus of the used material. Bending stiffness has effect on tension of hairs attached to it. Density and mass of the bow have effect on playability. Uniform material quality is important for a thin, elongated bow with desired qualities. A bow made of composite comprising organic natural fiber material may be designed to comprise desired properties. The bow according to embodiments may be integrally made, and/or it may be worked to put the last touch on desired geometry and/or qualities and/or properties.

A sound of piano is also based on oscillations of stretched strings. In a piano, a pressed key sets a hammer in motion. The hammer strikes a string and excites it to vibrate. Each string has a specific hammer and the hammers move via rather complicated mechanism including several smaller parts, like levers. The construction is preferably mechanically sustainable and stable. Small parts comprised in a piano generally require high wear resistance, long life cycle, toughness to resist repetitive impact load and dimensional stability. Hammers may comprise different specific frequencies to be utilized in different sections in the piano. A composition comprising organic natural feature and relatively high speed of sound may preferred as a part of a piano.

Xylophone makes sound by vibrating itself. Thus the material properties are decisive for the produced sound. Length of an individual xylophone bar is determines its vibration frequency. Bars of identical length and shape have vibrational frequencies that scale with the speed of sound from a used material. Material of xylophone preferably comprises high density. Further a side hardness is desired in order to be able to carry contact and/or impact loads caused to the xylophone during playing. Xylophone bars are excited impulsively and energy is transferred to a bar in a short time span compared to the time that the bar is vibrating in response. A mallet properties have effect on produced sound. Shorter contact time of a harder mallet produces bright sound, whereas longer contact time of a softer mallet produces more mellow sound. When solid material of xylophone vibrates, some of its mechanical energy is dissipated as heat by internal friction. While for wood components internal frictions are dependent on magnitudes interacting with external conditions, like temperature and moisture content, a composite according to embodiments resistant to changes in external conditions. The behaviour of components according to embodiments may be stabilized mechanically, as well as in view of sound quality. If loudness and reverberation time is desired from an impulsively excited instrument, the used material shall radiate sound well. Bars with a low coefficient will result in a brighter sound, because the higher partials are less damped than in a material with a high loss coefficient. Sound of a xylophone advantageously decays sufficiently slowly.

In percussion instruments, like a drum, sound originates from oscillation of a stretched membrane. The stretched membrane may be struck by a drum stick or player's hand in order to cause vibration of the membrane and produce a sound. Typically there is no recognisable tone or pitch, but the instruments are called and used as rhythm instruments. In rhythm instruments frequency, volume and attenuation have effect on sound and acoustic properties. For example a bowl of a drum, where the membrane is attached, may be made of a composite according to embodiments. Shape of the bowl has effect on tone quality of the drum. The bowl may be shaped as hemispheric in order to produce brighter tones, or parabolic in order to produce darker tones. Quality of a bowl surface has effect on timbre of a drum. The bowl surface may be designed to be smooth and even, or rough one comprising frequent dents.

Wind instruments, like flutes, clarinets or recorders, are based on a vibrating air column for sound creation. Wind instruments comprise an air column forming a resonating body to produce and radiate the sound. Shape and length of the air column, as well as shape and design of finger holes and a mouthpiece have effect on produced sound. Dimensional stability and resistant to moisture are important for material of the wind instruments. In addition to external conditions, breath of the musician introduces water into the air column. The material advantageously absorbs little moisture in order to avoid droplets on tube walls spoiling the sound. Dimensionally stable, moisture resistant material has effect on instrument remaining tuned over significant amount of time. Sound quality is determined by interaction of the material with an enclosed column of vibrating air. Material has effect on sound of the instrument by vibrational damping due to air friction at the tube walls and by turbulence in the vibrating air at the edges. Vibrational damping is lower in tunes with a smooth finish. Precise cutting and rounded finishing of edges reduce turbulences, which may dampen vibrations and affect tonal quality. Optimal finish of tube walls and finger holes, as well as high density is preferred qualities of the used material.

A composite comprising matrix material and organic natural fiber material may be used in musical instruments. Material properties, like density, modulus, damping and shrinkage may be designed according to desired acoustic properties. A composite according to embodiments may be designed to match properties of a material next to it, or to which the composite is attached, or integrated, or with the surrounding materials contributing to production of sound and/or quality of the sound. The material according to embodiments has effect of being resistant to external conditions. According to embodiments quality or performance of a musical instrument or part of it is not compromised due to exchanging moisture with air, as with wooden parts. According to embodiments dimensional stability and mechanical properties may be maintained in changing external conditions.

The previous description illustrates examples and embodiments of a composite comprising matrix material and organic natural fiber material, a component comprising matrix material and organic natural fiber material, and uses of the composites and the components. Any described examples, embodiments, illustrations, features and/or details thereof may be combined, replaced or exchanged between their corresponding and/or suitable parts. Obvious structural and/or functional modifications may be made to the previously described examples and embodiments within the scope of the following claims.

The invention claimed is:

1. A composite comprising matrix material and organic natural fiber based material, wherein
    the matrix material comprises a thermoplastic polymer matrix,
    the organic natural fiber material comprises lignin amount of less than 15 wt-%, and
    the composite comprises a relative sound wave resistance of 1500-5000;

wherein the organic natural fiber material comprises fibers in a flake form, wherein the flake form comprises length, width and thickness, and the width of the flake is at least 2 times the thickness of the flake.

2. A composite according to claim 1, wherein the composite comprises a relative damping of sound radiation of 1.5-5.0.

3. A composite according to claim 1, wherein the composite comprises a dynamic modulus of 2000-11000 measured according to ISO 6721-3.

4. A composite according to claim 1, wherein the composite comprises a relative acoustic quality factor of 5-200, wherein the relative acoustic quality factor is dependent on a relative sound wave resistance, a relative damping of sound radiation and a relative factor of viscous damping.

5. A composite according to the claim 1, wherein the composite comprises a relative factor of viscous damping of 0.500-0.005.

6. A composite according to claim 1, wherein the composite comprises the relative sound wave resistance of 1900-4500.

7. A composite according to claim 1, wherein the matrix material comprises polyolefin.

8. A composite according to claim 1, wherein the organic natural fiber material comprises chemically treated organic natural fiber material comprising chemical wood based pulp material.

9. A composite according to claim 1, wherein the width of the flake is at least 3 times the thickness of the flake.

10. A composite according to claim 1, wherein the organic natural fiber material comprises lignin amount of less than 5 wt-%.

11. A composite according to claim 1, wherein the composite comprises 5-75 wt % of the organic natural fiber material.

12. A composite according to claim 1, wherein the composite comprises 20-70 wt-% of the organic natural fiber material.

13. A composite according to claim 1, wherein the composite is formed by injection molding or by extrusion.

14. A composite according to claim 1, wherein the composite comprises thermal expansion coefficient of 40-80% of the thermal expansion coefficient of the matrix material.

15. A product comprising a component comprising a composite according to claim 1.

16. A loudspeaker comprising a composite comprising matrix material and organic natural fiber based material, wherein
the matrix material comprises a thermoplastic polymer matrix,
the organic natural fiber material comprises lignin amount of less than 15 wt-%, and
the composite comprises a relative sound wave resistance of 1500-5000, and
wherein the composite is arranged to form a cone and/or a tube and/or a casing of a loudspeaker.

17. A musical instrument comprising a composite comprising matrix material and organic natural fiber based material, wherein
the matrix material comprises a thermoplastic polymer matrix,
the organic natural fiber material comprises lignin amount of less than 15 wt-%, and
the composite comprises a relative sound wave resistance of 1500-5000.

18. The loudspeaker according to claim 16, wherein the organic natural fiber material comprises lignin amount of less than 5 wt-%.

19. The loudspeaker according to claim 16, wherein the composite comprises a relative damping of sound radiation of 1.5-5.0.

20. The loudspeaker according to claim 16, wherein the composite comprises a dynamic modulus of 2000-11000 measured according to ISO 6721-3.

* * * * *